(12) United States Patent
Brown et al.

(10) Patent No.: US 11,182,094 B2
(45) Date of Patent: Nov. 23, 2021

(54) PERFORMING A RECOVERY COPY COMMAND USING A RECOVERY COPY DATA STRUCTURE FOR A BACKUP VOLUME LOOKUP

(71) Applicant: International Business Machines Corporation, Armonk, NY (US)

(72) Inventors: Theresa M. Brown, Tucson, AZ (US); Gregory E. McBride, Vail, AZ (US); Mark L. Lipets, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 194 days.

(21) Appl. No.: 16/123,412

(22) Filed: Sep. 6, 2018

(65) Prior Publication Data

US 2020/0081801 A1    Mar. 12, 2020

(51) Int. Cl.
*G06F 3/06* (2006.01)
*H04L 29/08* (2006.01)
*G06F 11/14* (2006.01)

(52) U.S. Cl.
CPC .............. *G06F 3/065* (2013.01); *G06F 3/067* (2013.01); *G06F 3/0619* (2013.01); *G06F 11/1451* (2013.01); *G06F 11/1461* (2013.01); *G06F 11/1464* (2013.01); *G06F 11/1469* (2013.01); *H04L 67/1095* (2013.01); *H04L 67/2842* (2013.01)

(58) Field of Classification Search
CPC ...... G06F 3/0619; G06F 3/065; G06F 3/0656; G06F 3/0658; G06F 3/0659; G06F 3/0673; G06F 12/0802; G06F 2212/1032; G06F 11/1469; G06F 3/067; G06F 11/1451; G06F 11/1461; G06F 11/1464; H04L 67/1095; H04L 67/2842
See application file for complete search history.

(56) References Cited

U.S. PATENT DOCUMENTS

| | | | |
|---|---|---|---|
| 5,860,158 | A | 1/1999 | Pai et al. |
| 6,567,888 | B2 | 5/2003 | Kedem |
| 6,594,744 | B1 | 7/2003 | Humlicek et al. |
| 6,742,138 | B1 | 5/2004 | Gagne et al. |
| 7,543,110 | B2 | 6/2009 | Stolowitz |
| 7,584,339 | B1 | 9/2009 | Bingham et al. |

(Continued)

OTHER PUBLICATIONS

U.S. Appl. No. 15/611,569, filed Jun. 1, 2017, Total 46 pp.

(Continued)

*Primary Examiner* — Andrew J Cheong
(74) *Attorney, Agent, or Firm* — Janaki K. Davda; Konrad, Raynes, Davda and Victor LLP

(57) ABSTRACT

Provided are techniques for performing a recovery copy command using a recovery copy data structure for a backup volume lookup. In response to receiving a recovery copy command, a recovery copy data structure is created with indicators for storage locations and a recovery target data structure is created with indicators for storage locations. A read operation is received for a storage location in a cache. Based on a value of an indicator in the recovery copy data structure for the storage location and a value of an indicator in the recovery target data structure for the storage location, the data is staged from one of the production volume, the recovery volume, and a backup volume to the cache.

18 Claims, 14 Drawing Sheets

(56) References Cited

U.S. PATENT DOCUMENTS

| | | | |
|---|---|---|---|
| 8,010,495 | B1 | 8/2011 | Kuznetzov et al. |
| 8,055,938 | B1 | 11/2011 | Chatterjee et al. |
| 8,533,397 | B2 | 9/2013 | Bar-El et al. |
| 8,549,225 | B2 | 10/2013 | Blinick et al. |
| 8,713,272 | B2 | 4/2014 | Agombar et al. |
| 8,850,106 | B2 | 9/2014 | Benhase et al. |
| 8,938,428 | B1 | 1/2015 | Ozekinci et al. |
| 9,471,499 | B2 | 10/2016 | Brown et al. |
| 9,558,072 | B1 | 1/2017 | Mam |
| 9,600,375 | B2 | 3/2017 | Dain et al. |
| 9,600,377 | B1 | 3/2017 | Cohen et al. |
| 9,626,115 | B2 | 4/2017 | Dain et al. |
| 9,658,798 | B2 | 5/2017 | Ash et al. |
| 9,733,862 | B1 | 8/2017 | Klemm et al. |
| 9,817,724 | B2 | 11/2017 | Dain et al. |
| 9,852,198 | B1 | 12/2017 | Kuznetzov et al. |
| 9,857,962 | B2 | 1/2018 | Yui et al. |
| 9,857,996 | B2 | 1/2018 | Wilkinson |
| 9,927,980 | B1 | 3/2018 | LeCrone et al. |
| 10,013,361 | B2 | 7/2018 | Mannenbach et al. |
| 2005/0071372 | A1 | 3/2005 | Bartfai et al. |
| 2005/0171979 | A1 | 8/2005 | Stager et al. |
| 2006/0106891 | A1 | 5/2006 | Mahar et al. |
| 2007/0055833 | A1 | 3/2007 | Vu et al. |
| 2007/0271429 | A1* | 11/2007 | Eguchi .............. G06F 11/1471 711/162 |
| 2008/0155216 | A1 | 6/2008 | Shoham |
| 2008/0222377 | A1 | 9/2008 | Wightwick et al. |
| 2009/0037482 | A1 | 2/2009 | Arakawa et al. |
| 2009/0313428 | A1 | 12/2009 | De Jong |
| 2014/0108756 | A1 | 4/2014 | Brown et al. |
| 2014/0344526 | A1 | 11/2014 | Brown et al. |
| 2015/0081628 | A1 | 3/2015 | Brown et al. |
| 2015/0261678 | A1 | 9/2015 | Gupta et al. |
| 2015/0286424 | A1 | 10/2015 | Dain et al. |
| 2015/0286432 | A1 | 10/2015 | Dain et al. |
| 2015/0286542 | A1 | 10/2015 | Dain et al. |
| 2016/0232102 | A1 | 8/2016 | Ash et al. |
| 2016/0253121 | A1 | 9/2016 | Guo et al. |
| 2016/0259574 | A1 | 9/2016 | Carpenter et al. |
| 2016/0291890 | A1 | 10/2016 | Jennas et al. |
| 2016/0335164 | A1* | 11/2016 | Dudgeon ............ G06F 11/1435 |
| 2017/0153950 | A1 | 6/2017 | Iwasaki et al. |
| 2017/0161153 | A1 | 6/2017 | Dain et al. |
| 2017/0177443 | A1 | 6/2017 | Figueroa et al. |
| 2017/0351434 | A1* | 12/2017 | Nakajima .................. G06F 9/50 |
| 2018/0136874 | A1 | 5/2018 | Karve et al. |
| 2018/0150229 | A1 | 5/2018 | Brown et al. |
| 2018/0349238 | A1 | 12/2018 | Boshev et al. |
| 2019/0138405 | A1 | 5/2019 | Li |

OTHER PUBLICATIONS

U.S. Appl. No. 15/663,727, filed Jul. 29, 2017, Total 65 pp.
U.S. Appl. No. 15/828,288, filed Nov. 30, 2017, Total 51 pp.
U.S. Appl. No. 15/828,302, filed Nov. 30, 2017, Total 48 pp.
Azagury et al.; "Point-In-Time Copy: Yesterday, Today and Tomorrow", IBM Storage Systems Group, 2002, pp. 259-270.
Anonymous, "Data Aware Optimized Backups—Object & System Level", dated Jun. 2, 2016, an IP.com Prior Art Database Technical Disclosure, IPCOM000246384D, Total 7 pp.
IBM, "Data Protection Manager for Exchange 2010 and the IBM® Storwize® V7000 with SAN Based Replica Creation and Recovery" Installation and Configuration Guide, dated Jul. 2011, Version: 2.7.4,Total 44 pp.
Dufrasne et al., "IBM D58880 Architecture and Implementation (Release 8.3)", IBM, Nov. 2017, Total 510 pp.
Emc et al.; "Introduction to XtremIO Virtual Copies", White Paper, Part No. H13035-01 (Rev. 02), Mar. 2016, pp. 1-39.
Brooks et al., "IBM Tivoli Storage Manager for Advanced Copy Services" dated Dec. 2006, International Technical Support Organization, Total 318 pp.
Lim, S. et al., "Efficient Journaling Writeback Schemes for Reliable and High-Performance Storage Systems", Pers Ubiquit Comput, 17, 2013, 14 pp.
Mell, P. and T. Grance, "Effectively and Securely Using the Cloud Computing Paradigm", [online], Oct. 7, 2009, retrieved from the Internet at <URL: http://csrc.nist.gov/groups/SNS/cloud-computing/cloud-computing-v26.ppt>, Total 80 pp.
Mell, P. and T. Grange, "The NIST Definition of Cloud Computing (Draft)", Sep. 2011, Computer Security Division Information Technology Laboratory National Institute of Standards and Technology, Total 7 pp.
Anonymous, "Method for Enhanced Application Performance During FlashCopy Restore in Multi-tier Storage Environment", dated Nov. 28, 2017, an IP.com Prior Art Database Technical Disclosure, IPCOM000251706D, Total 8 pp.
Taylor, Chris; "Effective Backups: Selecting the Right Backup Mechanism to Match the Business Requirement", Session 16273, pp. 1-62, 2014.
Anonymous, "Tweak Modification to Improve Reliability and Durability in an Encrypted Flash Based Back-Up System" dated Jan. 25, 2017, an IP.com Prior Art Database Technical Disclosure, IPCOM000248984D, Total 4 pp.
Wu, et al., "LDM: Log Disk Mirroring with Improved Performance and Reliability for SSD-Based Disk Arrays", ACM Transactions on Storage, vol. 12, No. 4, Article 22, May 2016, 21 pp.
Yang et al.; "TRAP-Array: A Disk Array Architecture Providing Timely Recovery to Any Point-in-time," 33rd International Symposium on Computer Architecture (ISCA'06), Boston, MA, 2006, pp. 289-301.
Wikipedia, "Binary Search Algorithm", [online], edited on Aug. 14, 2018. Retrieved from the Internet at: <URL: https://en.wikipedia.org/w/index.php?title=Binary_search_algorithm&oldid=854879077>, Total 8 pp.
U.S. Appl. No. 16/123,674, filed Sep. 6, 2018, Total 30 pp.
U.S. Appl. No. 16/123,635, filed Sep. 6, 2018, Total 36 pp.
U.S. Appl. No. 16/123,457, filed Sep. 6, 2018, Total 53 pp.
U.S. Appl. No. 16/123,618, filed Sep. 6, 2018, Total 41 pp.
U.S. Appl. No. 16/123,486, filed Sep. 6, 2018, Total 57 pp.
U.S. Appl. No. 16/123,771, filed Sep. 6, 2018, Total 58 pp.
U.S. Appl. No. 16/123,445, filed Sep. 6, 2018, Total 66 pp.
U.S. Appl. No. 16/123,660, filed Sep. 6, 2018, Total 31 pp.
List of IBM Patents or Patent Applications Treated as Related, Dec. 18, 2018, Total 2 pp.
Office Action, dated Sep. 19, 2019, for U.S. Appl. No. 16/123,457, filed Sep. 6, 2018, Total 26 pp.
Response to OA, dated Dec. 18, 2019, U.S. Appl. No. 16/123,457, filed Sep. 6, 2018, Total 16 pp.
Final Office Action, dated Jan. 13, 2020, for U.S. Appl. No. 16/123,457, filed Sep. 6, 2018, Total 23 pp.
Response to Final Office Action, dated Mar. 26, 2020, for U.S. Appl. No. 16/123,457, filed Sep. 6, 2018, Total 18 pp.
Office Action, dated Jan. 23, 2020, for U.S. Appl. No. 16/123,771, filed Sep. 6, 2018, Total 30 pages.
Response to Office Action, filed Mar. 26, 2020, for U.S. Appl. No. 16/123,771, filed Sep. 6, 2018, Total 18 pages.
Notice of Allowance, dated May 20, 2020, for U.S. Appl. No. 16/123,771, filed Sep. 6, 2018, Total 13 pages.
Notice of Allowance, dated Jan. 7, 2021, for U.S. Appl. No. 16/123,457, filed Sep. 6, 2018, total 27 pp.

* cited by examiner

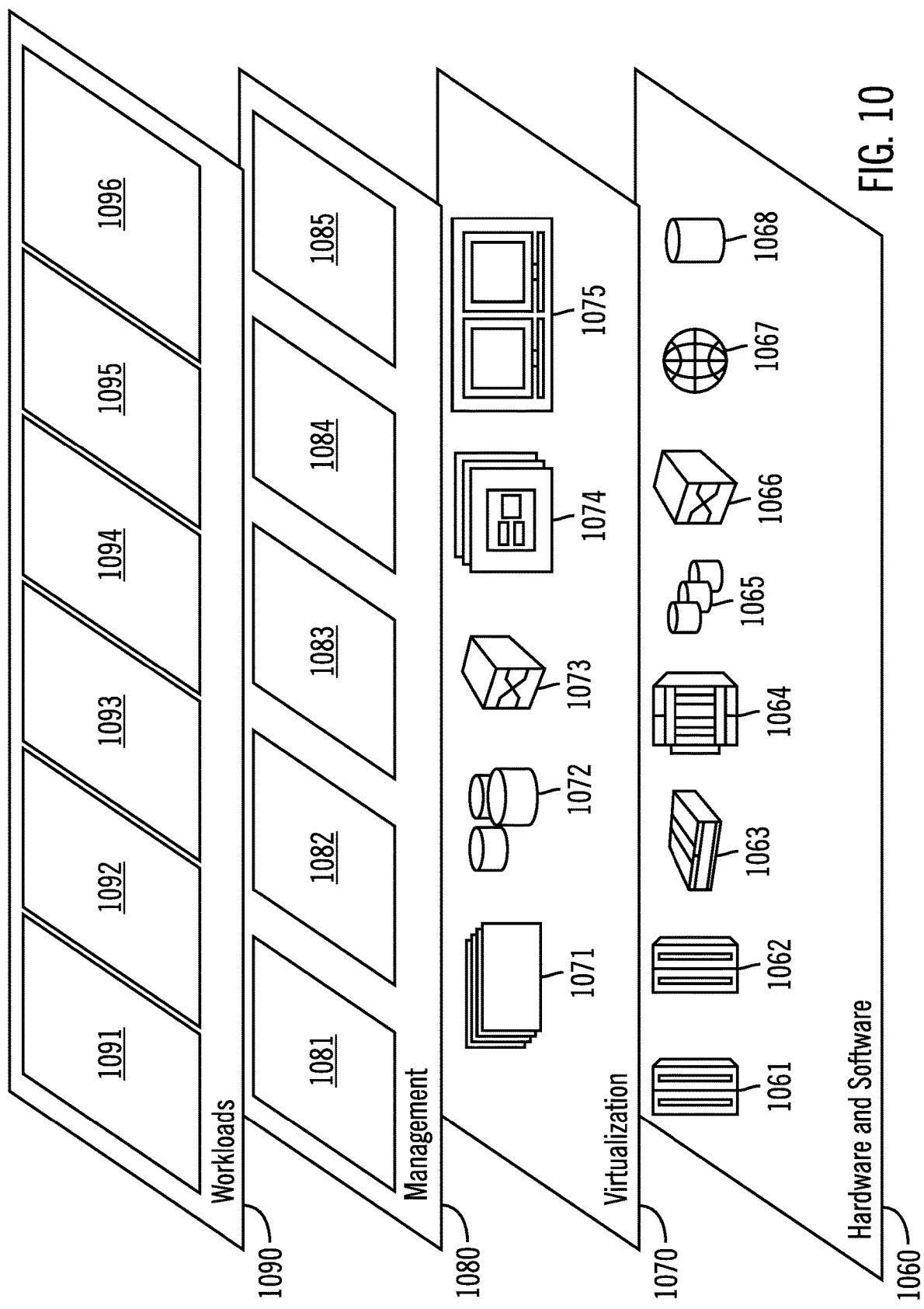

PERFORMING A RECOVERY COPY COMMAND USING A RECOVERY COPY DATA STRUCTURE FOR A BACKUP VOLUME LOOKUP

BACKGROUND

1. Field of the Invention

Embodiments of the invention relate to performing a recovery copy command using a recovery copy data structure for a backup volume lookup.

2. Description of the Related Art

Data storage systems, particularly at the enterprise level, are usually designed to provide a high level of redundancy to reduce the risk of data loss in the event of failure of a component of the data storage system. Thus, multiple copies of data are frequently stored on multiple systems, which may be geographically dispersed. Thus, data from a host to be stored in the data storage system is typically directed to a primary system at a local site and then replicated to a secondary system, which may be geographically remote from the primary system.

The process of replicating, that is, copying data over to the secondary system may be set up in either a synchronous or an asynchronous relationship between the primary system and the secondary system. In a synchronous relationship, any updates to the primary system are typically synchronized with the secondary system, that is, successfully copied over to the secondary system, before the primary system reports to the host that the data storage input/output operation has been successfully completed. As a result, data storage to a primary storage system and a secondary system in a synchronous relationship may adversely affect system performance of the host while the host awaits completion of the synchronous copy operations. In storage systems in which the primary and secondary systems are widely separated, delays to completion of the synchronous copy operations may be greater, which can further adversely affect host performance. For example, in storage systems in which the primary system and the secondary system are separated by a geographical distance of 300 kilometers (Km) or more, for example, there can be a delay of 3-5 seconds (or more) before the data is successfully replicated at the secondary system.

As a result, storage systems frequently employ an asynchronous relationship between a primary system and a secondary system, particularly if the secondary system is geographically distant from the primary system. In an asynchronous relationship, successful updates to the primary system are typically reported to the host as a successful storage input/output operation without waiting for the update to be replicated to the secondary system. As a result, the host need not wait for the data replication to the secondary system to be completed, and the performance of the host system may be enhanced accordingly.

As the name suggests, in an asynchronous relationship, the primary system and the secondary system may not be fully synchronized at any one time. Thus, data stored on the secondary system typically lags that stored in the primary system. Accordingly, new data stored on a primary system may not be stored on the secondary system for an interval of time such as 3-5 seconds, for example.

In data replication systems, data is typically maintained in volume pairs, comprising a primary volume in a primary storage device and a corresponding secondary volume in a secondary storage device that includes an identical copy of the data maintained in the primary volume. The primary and secondary volumes are identified by a copy relationship in which the data of the primary volume, also referred to as the source volume, is copied to the secondary volume, also referred to as the target volume. Primary and secondary storage controllers may be used to control access to the primary and secondary storage devices.

A near instantaneous copy of a volume may be generated using a point-in-time copy function such as the IBM® FlashCopy® function, for example. (IBM and FlashCopy are registered trademarks or common law marks of International Business Machines Corporation in the United States and/or other countries.) The point-in-time copy function creates a "snapshot" of the contents of a source volume as of a particular point-in-time in a target volume which may be referred to as the point-in-time copy volume. One version of a point-in-time copy function transfers the contents of the source volume to the point-in-time copy volume in a background copy operation. The point-in-time copy function may also be referred to as a point-in-time snap copy function. A point-in-time copy may be described as a copy of the data consistent as of a particular point-in-time, and would not include updates to the data that occur after the point-in-time.

A point-in-time copy involves establishing a logical point-in-time relationship between source and target volumes on the same or different devices. The point-in-time copy guarantees that until a track in a point-in-time relationship has been hardened to its location on the target disk, the track resides on the source disk. A relationship table is used to maintain information on all existing point-in-time relationships in the subsystem. During the establish phase of a point-in-time relationship, one entry is recorded in the source relationship table for the source and in the target relationship table for the target that participate in the point-in-time being established. Each added entry maintains all the required information concerning the point-in-time relationship. Both entries for the relationship are removed from the relationship tables when all point-in-time tracks from the source extent have been physically copied to the target extents or when a withdraw command is received. In certain cases, even though all tracks have been copied from the source extent to the target extent, the relationship persists.

The target relationship table further includes a bitmap that identifies which tracks involved in the point-in-time relationship have not yet been copied over and are thus protected tracks. Each track in the target device is represented by one bit in the bitmap. The target bit is set (e.g., either logically or physically) when the corresponding track is established as a target track of a point-in-time relationship. The target bit is reset when the corresponding track has been copied from the source location and destaged to the target device due to writes on the source or the target device, or a background copy task.

Once the logical relationship is established, hosts may then have immediate access to data on the source and target volumes, and the data may be copied as part of a background operation. A read to a track that is a target in a point-in-time relationship and not in cache triggers a stage intercept, which causes the source track corresponding to the requested target track to be staged to the target cache when the source track has not yet been copied over and before access is provided to the track from the target cache. This ensures that the target has the copy from the source that existed at the point-in-time of the point-in-time copy. Further, any destages to tracks on the source device that have not been copied over triggers a destage intercept, which causes the tracks on the source device to be copied to the target device.

Another version of a point-in-time copy function omits the background copy operation. Thus, the contents of the source volume are not transferred to the point-in-time copy volume in a background copy operation but are transferred in response to an update of the source volume. Accordingly, any read operations directed to a track of the point-in-time copy volume are usually redirected to obtain the contents of that track from the source volume. However, if the host directs an update to a track of the source volume, the contents of the track of the source volume are transferred to the point-in-time copy volume before the update is permitted to overwrite the contents of that track of the source volume.

In a synchronous data replication system, a point-in-time copy volume may be made of a primary volume at the primary system with respect to the contents of the primary volume as of a particular point-in-time, and a point-in-time copy volume may be made of a secondary volume at the secondary system with respect to the contents of the secondary volume as of the same point-in-time. Because the primary and secondary volumes are synchronized, the respective point-in-time copy volumes will also be synchronized and therefore consistent with each other notwithstanding that the point-in-time copy volumes are made in different places, that is, the primary system and the secondary system.

In an asynchronous data replication system, a point-in-time copy volume may also be made of a primary volume at the primary system with respect to the contents of the primary volume as of a particular point-in-time. Similarly, a point-in-time copy volume may be made of a secondary volume at the secondary system with respect to the contents of the secondary volume as of a particular point-in-time. However, because the primary and secondary volumes are not synchronized, the respective point-in-time copy volumes will also not be synchronized and therefore will not be consistent with each other. Hence, to provide a backup copy of a point-in-time copy volume of a primary volume at the primary system, the point-in-time copy volume generated at the primary system is typically transferred over a network to the secondary system.

To maintain a degree of consistency of data across multiple volumes at a secondary system, a Peer-to-Peer Remote Copy (PPRC) function supports the concept of a PPRC consistency group. Volumes in a PPRC relationship that are configured into a PPRC consistency group are maintained to ensure that a group of updates made to volumes at the primary system are also eventually made on the volumes at the secondary system to maintain data consistency for those volumes of the group. Accordingly, consistency groups may be formed between volumes of the primary system and the secondary system which are consistent with respect to a particular set of updates or a particular point in time, notwithstanding the overall asynchronous relationship between the primary system and the secondary system.

In some environments, there is a point-in-time copy from a primary volume of a storage controller to a backup volume of the storage controller and to a recovery volume of the storage controller. Thus, the backup volume is the target for two point-in-time-copies.

The backup volume may be referred to as a safeguarded copy backup volume, having safeguarded volumes, because the backup volume is not host accessible (e.g., not host addressable). Also, this backup volume contains "undo logs" that allow a user to view/update a particular consistency group (or time version) of the safeguarded volume. The consistency group is accessible by creating a relationship between the backup volume and the recovery volume, which is host accessible. The recovery volume is used to view/update the chosen consistency group of the backup volume. The backup volume may contain many terabytes of data and hundreds of different consistency groups. For any one data track, there may be hundreds of different consistency groups (e.g., if a track was updated during every consistency group). Searching through the backup volume for a chosen time version of any one track may be time consuming. Once that version is found, the correct track version may have to be re-accessed, which may require another search in conventional systems.

With some systems, a safeguarded copy function provides a set of backup copies in the backup volume to protect a safeguarded production volume. The backup volume may contain many different time versions of the source volume (i.e., an undo log). The backup volume itself is not host accessible, and this is done to protect the backup copies from accidental or malicious corruption or deletion. In order to perform analysis of a particular backup copy, to determine if a pre-corruption copy of the data exists in that time version, or to test recovery procedures, the host needs to be able to access a particular chosen time version on the backup volume.

SUMMARY

Provided is a computer program product for performing a recovery copy command using a recovery copy data structure for a backup volume lookup. The computer program product comprises a computer readable storage medium having program code embodied therewith that is executable by at least one processor. In response to receiving a recovery copy command to recover data from a production volume to a recovery volume, where the recovery copy command specifies a recovery sequence number of a consistency group of the data to be recovered, a recovery copy data structure is created with indicators for storage locations, where each of the indicators indicates whether data in the storage locations is valid, and a recovery target data structure is created with indicators for storage locations, where each of the indicators indicates whether data in the storage locations is valid. A read operation is received for a storage location in a cache. Based on a value of an indicator in the recovery copy data structure for the storage location and a value of an indicator in the recovery target data structure for the storage location, the data is staged from one of the production volume, the recovery volume, and a backup volume to the cache.

Provided is a computer system for performing a recovery copy command using a recovery copy data structure for a backup volume lookup. The computer system comprises one or more processors, one or more computer-readable memories and one or more computer-readable, tangible storage devices; and program instructions, stored on at least one of the one or more computer-readable, tangible storage devices for execution by at least one of the one or more processors via at least one of the one or more memories, to perform operations. In response to receiving a recovery copy command to recover data from a production volume to a recovery volume, where the recovery copy command specifies a recovery sequence number of a consistency group of the data to be recovered, a recovery copy data structure is created with indicators for storage locations, where each of the indicators indicates whether data in the storage locations is valid, and a recovery target data structure is created with indicators for storage locations, where each of the indicators indicates whether data in the storage locations is valid. A read operation is received for a storage location in a cache. Based on a value of an indicator in the recovery copy data structure for the storage location and a value of an indicator in the recovery target data structure for the storage location, the data is staged from one of the production volume, the recovery volume, and a backup volume to the cache.

Provided is a method for performing a recovery copy command using a recovery copy data structure for a backup volume lookup. The method is implemented in a computer. In response to receiving a recovery copy command to recover data from a production volume to a recovery volume, where the recovery copy command specifies a recovery sequence number of a consistency group of the data to be recovered, a recovery copy data structure is created with indicators for storage locations, where each of the indicators indicates whether data in the storage locations is valid, and a recovery target data structure is created with indicators for storage locations, where each of the indicators indicates whether data in the storage locations is valid. A read operation is received for a storage location in a cache. Based on a value of an indicator in the recovery copy data structure for the storage location and a value of an indicator in the recovery target data structure for the storage location, the data is staged from one of the production volume, the recovery volume, and a backup volume to the cache.

Thus, embodiments advantageously determine whether to stage data from one of the production volume, the recovery volume, and the backup volume to a cache using two data structures: a recovery copy data structure and a recovery target data structure. This processing allows for backup volume lookup.

In certain embodiments, in response to determining that the indicator in the recovery copy data structure for the storage location is set to indicate that the data has been copied to the storage location of the recovery volume from the backup volume or was not found on the backup volume and that the indicator in the recovery target data structure for the storage location is set to indicate that the data has been copied to the storage location of the recovery volume from the production volume, the data is staged from the storage location on the recovery volume to the cache. This advantageously allows for staging data from the recovery volume instead of another volume.

In other embodiments, in response to determining that the indicator in the recovery copy data structure for the storage location is set to indicate that the data has been copied to the storage location of the recovery volume from the backup volume or was not found on the backup volume and that the indicator in the recovery target data structure for the storage location is set to indicate that the data has not been copied to the storage location of the recovery volume from the production volume, the data is staged from the storage location on the production volume to the cache. The data is destaged for the storage location from the cache to the recovery volume. The indicator is reset for the storage location in the recovery target data structure to indicate that the data is valid for that storage location. The indicator is reset for the storage location in the recovery copy data structure to indicate that the data is valid for that storage location. This advantageously stages the data from the production volume to the cache and destages the data from the cache to the recovery volume to update the recovery volume.

In additional embodiments, in response to determining that the indicator in the recovery copy data structure for the storage location is set to indicate that the data has not been copied to the storage location of the recovery volume from the backup volume and determining that the data is found on the backup volume, the data is staged from the storage location on the backup volume to the cache. The data for the storage location is destaged from the cache to the recovery volume. The indicator is reset for the storage location in the recovery target data structure to indicate that the data is valid for that storage location. The indicator is reset for the storage location in the recovery copy data structure to indicate that the data is valid for that storage location. This advantageously stages the data from the backup volume to the cache and destages the data from the cache to the recovery volume to update the recovery volume.

In further embodiments, in response to determining that the indicator in the recovery copy data structure for the storage location is set to indicate that the data has not been copied to the storage location of the recovery volume from the backup volume and determining that the data is not found on the backup volume, the indicator is reset for the storage location in the recovery copy data structure to indicate that the data was not found on the backup volume. In response to determining that the indicator in the recovery target data structure for the storage location is set to indicate that the data has been copied to the storage location of the recovery volume from the production volume, the data is staged from the recovery volume to the cache. This advantageously stages the data from the recovery volume when the data is not found on the backup volume.

In yet other embodiments, in response to determining that the indicator in the recovery copy data structure for the storage location is set to indicate that the data has not been copied to the storage location of the recovery volume from the backup volume and determining that the data is not found on the backup volume, the indicator is reset for the storage location in the recovery copy data structure to indicate that the data was not found on the backup volume. In response to determining that the indicator in the recovery target data structure for the storage location is set to indicate that the data has not been copied to the storage location of the recovery volume from the production volume, the data is staged from the production volume to the cache. The data for the storage location is destaged from the cache to the recovery volume. The indicator is reset for the storage location in the recovery target data structure to indicate that the data is valid for that storage location. The indicator is reset for the storage location in the recovery copy data structure to indicate that the data is valid for that storage location. This advantageously stages data from the production volume when the current data is not found on the backup volume and is not available on the recovery volume.

In yet further embodiments, a storage controller, production storage containing the production volume, backup storage containing the backup volume, recovery storage containing the recovery volume, and the cache are in a cloud infrastructure. This advantageously allows for a backup volume lookup in a cloud infrastructure.

BRIEF DESCRIPTION OF THE SEVERAL VIEWS OF THE DRAWINGS

Referring now to the drawings in which like reference numbers represent corresponding parts throughout:

FIG. 10 illustrates abstraction model layers in accordance with certain embodiments.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Embodiments advantageously allow a user to create a relationship between the safeguarded production volume, the backup volume (that is not host accessible), and a host accessible recovery volume, such that the recovery volume stores a particular consistency group (i.e., time version) of the safeguarded production volume and is host accessible for reads and/or writes.

Embodiments advantageously perform a recovery copy command using a recovery copy data structure for a backup volume lookup. The recovery copy command copies data from the backup volume that is not host accessible to a recovery volume that is host accessible. With use of the recovery copy data structure, in addition to a recovery target data structure, embodiments enable finding a particular time version of a storage location (e.g., track) in the backup volume and accessing it again without having to search the backup volume again.

Figure 1:
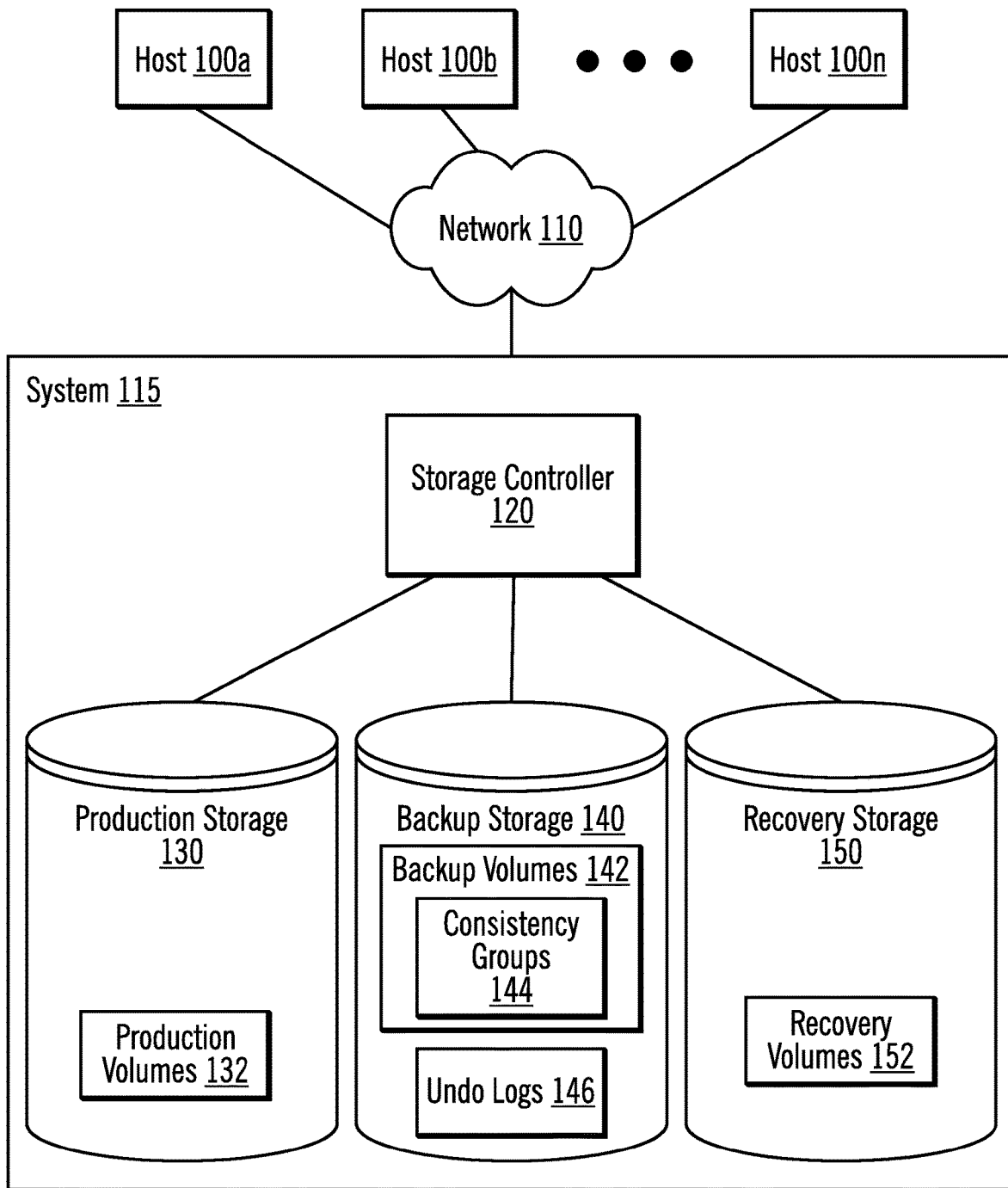
FIG. 1 illustrates, in a block diagram, a computing environment with a primary storage controller coupled to a production storage, a backup storage, and a recovery storage in accordance with certain embodiments.

FIG. 1 illustrates, in a block diagram, a computing environment with a storage controller 120 coupled to a production storage 130, a backup storage 140, and a recovery storage 150 in accordance with certain embodiments. In various embodiments, the storage controller 120 may be a primary storage controller, a secondary storage controller, a tertiary storage controller, etc. In certain embodiments, the backup storage 140 is a safeguarded backup storage, having safeguarded volumes, that the backup storage 140 is not host accessible. The backup storage 140 includes backup volumes 142, which store data in consistency groups 144, and undo logs 146 (which store data and allow a user to view/update a particular consistency group (i.e., time version) of the safeguarded volume). In certain embodiments, the recovery storage 150 is host accessible.

A plurality of hosts 100a, 100b, . . . 100n are coupled, via a network 110, to the storage controller 120 of a system 115. The plurality of hosts 100a, 100b, . . . 100n may write updates to the storage controller 120 for storage in the production storage 130. Also, with embodiments, the plurality of hosts 100a, 100b, . . . 100n may submit Input/Output (I/O) requests to the storage controller ("storage control unit") 120 over the network 110 to access data in production volumes 132 of the production storage 130 and recovery volumes 152 of the recovery storage 150.

The production storage 130, the backup storage 140, and the recovery storage 150 may be storage drives. The production volumes 132, the backup volumes 142, and the recovery volumes 152 may be, for example, Logical Unit Numbers, Logical Devices, Logical Subsystems, etc.

With certain embodiments, the production storage 130, the backup storage 140, and the recovery storage 150 may be located at different sites, which may be geographically or functionally remote from each other. Thus, in such embodiments, the geographically separate sites may be separated by a short or long geographical distance. Alternatively, the sites may be relatively close, such as in different buildings in the same general geographical location, in different rooms of the same building, in different machines in the same room, or in different portions or partitions of the same machine, of the network 110.

Figure 2:
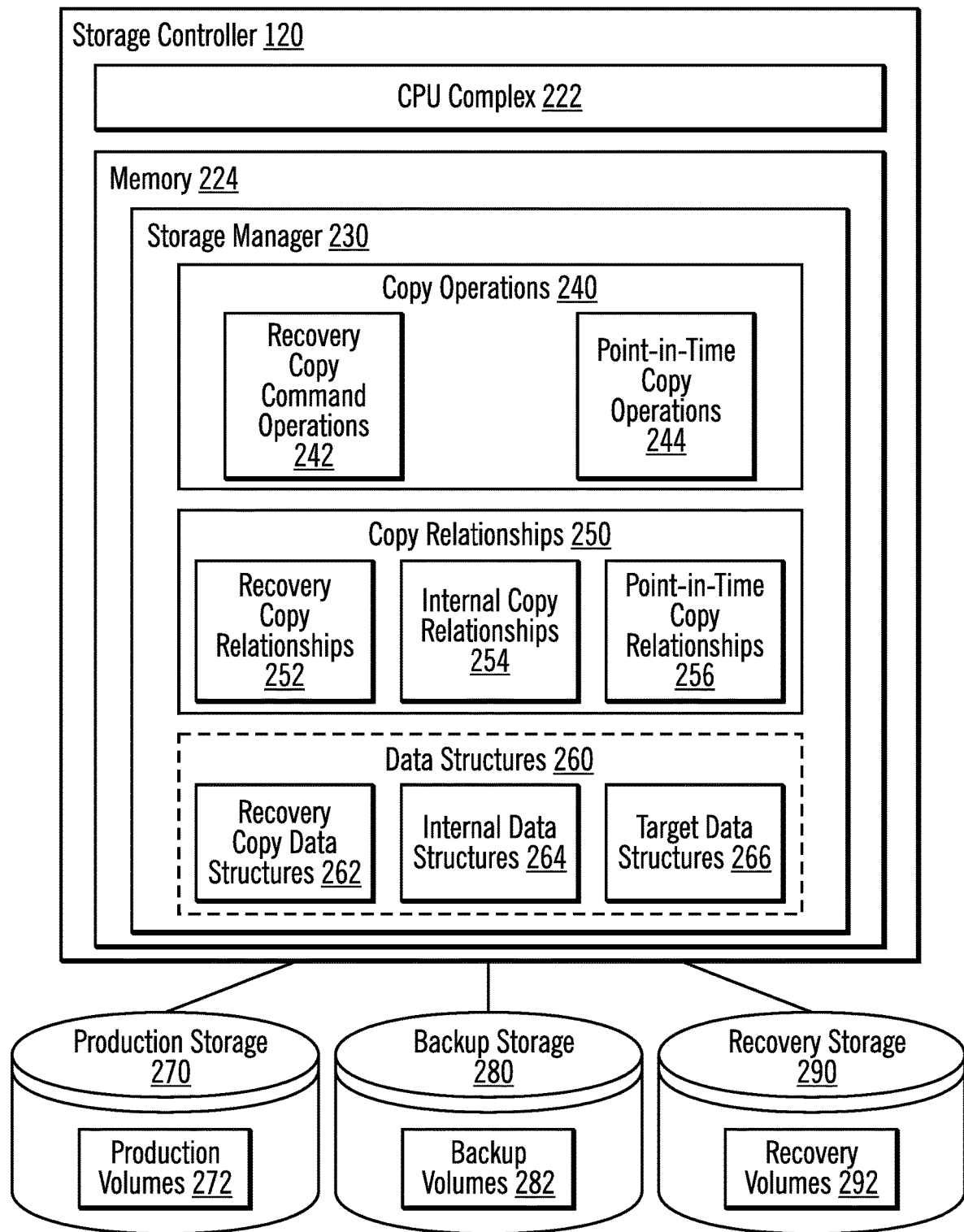
FIG. 2 illustrates, in a block diagram, further details of a storage controller in accordance with certain embodiments.

FIG. 2 illustrates, in a block diagram, further details of the storage controller 120 in accordance with certain embodiments. The storage controller 120 includes a Central Processing Unit (CPU) complex 222, including one or more processors or central processing units, each having a single or multiple processor cores. In certain embodiments, a processor core contains the components of a CPU involved in executing instructions, such as an arithmetic logic unit (ALU), floating point unit (FPU), and/or various levels of cache (such as L1 and L2 cache), for example. It is appreciated that a processor core may have other logic elements in addition to or instead of those mentioned herein.

Also, the storage controller 120 includes a memory 224 that includes a storage manager 230 for managing storage operations, including data replication operations between storages 130, 140, 150. The storage manager 230 includes copy operations 240, copy relationships 250, and data structures 260 (e.g., bitmaps).

The copy operations 240 include recovery copy command operations 242 and point-in-time copy operations 244. The copy relationships 250 include recovery copy relationships 252 and internal copy relationships 254 for recovery copy command operations 242 and point-in-time copy relationships 256 for point-in-time copy operations 244.

With embodiments, at any time, there may be one or more of each of the copy operations 240 and the copy relationships 250.

In a particular copy relationship from a first volume to a second volume, the first volume is referred to as the source volume, while the second volume is referred to as the target volume.

The data structures 260 include recovery copy data structures 262, internal data structures 264, and target data structures 266.

A recovery copy data structure 262 is created for a recovery copy command and is stored on a target volume (instead of on the source volume). In certain embodiments, the recovery copy command copies data from a backup volume (a source) to a recovery volume (a target). The recovery copy data structure 262 has an indicator (e.g., a bit) for each storage location (e.g., track) on the backup volume, which is safeguarded. An indicator set to a first value (e.g., to one) indicates that data needs to be copied to that storage location in the recovery volume from the backup volume (the source) (and the current data for the storage location is at the backup volume). An indicator set to a second value (e.g., set to zero or "reset" to zero) indicates that the current data for the storage location is valid on the recovery volume (e.g., data has been copied to the recovery volume from the backup volume or was not found on the backup volume).

An internal data structure 264 is also created for the recovery copy command and is stored on the backup volume. The internal data structure 264 is used to indicate where data is to be retrieved for the recovery volume.

A target data structure 266 is created for a point-in-time copy operation and is stored on a target volume (instead of on the source volume). In certain embodiments, the point-in-time copy is from a production volume (a source) to a recovery volume (a target). An indicator set to a first value (e.g., to one) indicates that data needs to be copied to that storage location in the recovery volume from the production volume (the source) (and the current data for the storage location is at the production volume). An indicator set to a second value (e.g., set to zero or "reset" to zero) indicates that the current data for the storage location on the recovery volume is valid (e.g., data has been copied to the recovery volume from the production volume or has been written directly to the recovery volume).

The copy relationships 250 between a source and a target associate source storage locations in source volumes and corresponding target storage locations in target volumes, such that updates to source storage locations are copied to the corresponding target storage locations.

With embodiments, the storage manager 230 is depicted as software stored in the memory 224 and executed by the CPU complex 222. However, it is appreciated that the logic functions of the storage manager 230 may be implemented as hardware, software, firmware or combinations of one or more thereof, depending upon the particular application.

Figure 3:
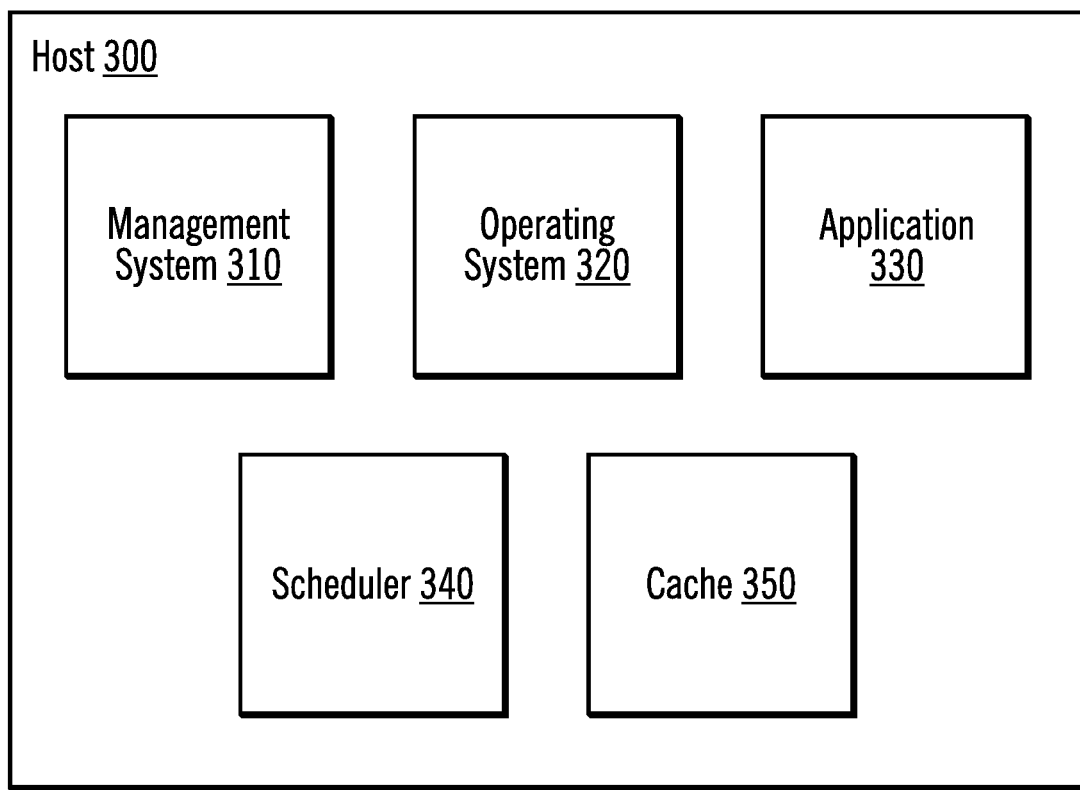
FIG. 3 illustrates, in a block diagram, further details of a host in accordance with certain embodiments.

FIG. 3 illustrates, in a block diagram, further details of a host 300 in accordance with certain embodiments. Each of the hosts 100a, 100b, . . . 100n may each include the components of host 300. Host 300 includes a management system 310, an operating system 320, an application 330, a scheduler 340, and cache 350. The management system 310 allows a user to issue a recovery copy command. The scheduler 340 periodically forms consistency groups on the backup volumes. The consistency groups may be referred to as time versions or recovery points starting at a point in time (a timestamp) and going to a "blackline" (a new timestamp). The blackline is set during the recovery copy command and is used to determine when to stop searching for data on the backup volume in a particular time version (i.e., consistency group). In certain embodiments, the blackline is set to a current consistency group insertion point. The application 330 reads data from and writes updates via a storage controller 120 to the production storage 130 or the recovery storage 150.

In certain embodiments, the management system 310 monitors failures in the availability of the storage controller 120 and its associated storage 130, 140, 150. In certain embodiments, the management system 310 and the application may be on different hosts. In certain embodiments, the management system 310 may be operated in a device apart from the hosts. In certain embodiments, a host that includes the management system 310 may omit the application 330.

As used herein, the term "storage location" may refer to a track of a disk storage unit, but may also reference to other units of data (or data units) configured in the storage 130, 140, 150 such as a bit, byte, word, segment, page, block (such as a Logical Block Address (LBA)), etc., which may be a part of a larger grouping of data units, such as those stored collectively as a volume, logical device, etc. of data.

In certain embodiments, the storages 130, 140, 150 are storage devices that may be comprised of one or more sequential access storage devices, such as hard disk drives and magnetic tape or may include non-sequential access storage devices such as solid state drives (SSD), for example. Each storage device may comprise a single sequential or non-sequential access storage device or may comprise an array of storage devices, such as a Just a Bunch of Disks (JBOD), Direct Access Storage Device (DASD), Redundant Array of Independent Disks (RAID) array, virtualization device, tape storage, flash memory, etc.

Furthermore, as used herein, the term "unit of storage" or "storage unit" refers to one or more units of data storage capable of storing one or more data units such as one or more volumes, cylinders, tracks, segments, extents, or any portion thereof, or other unit or units of data suitable for transfer. Thus, a source storage unit and the associated target storage unit may each be a storage volume. However, it is appreciated that a source storage unit and a target storage unit may each be of a size other than a volume, for example.

The system components 100a, 100b, . . . 100n, 120, 130, 140, 150 are connected to the network 110 which enables communication among these components. Thus, the network 110 includes a fabric which may comprise a Storage Area Network (SAN), Local Area Network (LAN), Intranet, the Internet, Wide Area Network (WAN), peer-to-peer network, wireless network, arbitrated loop network, etc. Communication paths from the storage subsystems to the hosts 100a, 100b, 100n may be based upon a particular host attachment protocol such as Fibre Connection (FICON), for example. Other communication paths of the fabric may comprise for example, a Fibre Channel arbitrated loop configuration, a serial loop architecture or a bus interface, such as a Peripheral Component Interconnect (PCI) interface such as a PCI-Express interface. The communication paths of the fabric may also be part of an Ethernet network, for example, such that each node has an individual network (internet protocol) address. Other types of communication paths may be utilized, such as a modem telephone path, wireless network, etc., depending upon the particular application.

Communication software associated with the communication paths includes instructions and other software controlling communication protocols and the operation of the communication hardware in accordance with the communication protocols, if any. It is appreciated that other communication path protocols may be utilized, depending upon the particular application.

Figure 4:
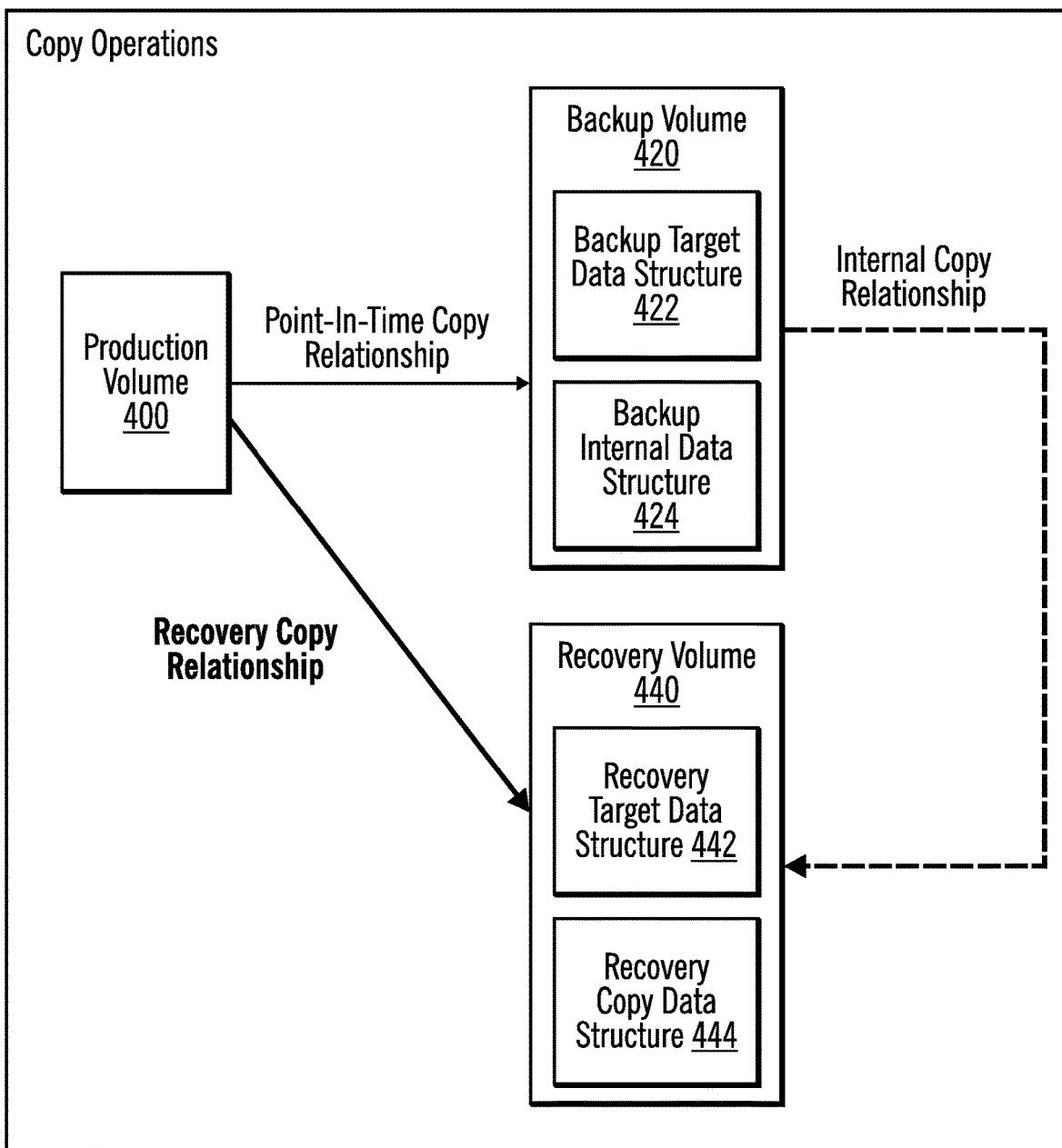
FIG. 4 illustrates copy operations in accordance with certain embodiments.

FIG. 4 illustrates copy operations in accordance with certain embodiments. For a point-in-time copy operation from the production volume 400 (source) to the backup volume 420 (target), there is a point-in-time copy relationship between the production volume 400 and the backup volume 420 and there is a backup target data structure 422 that indicates whether storage locations on the backup volume 420 have current data copied over from the production volume 400. The point-in-time copy operation from the production volume 400 (source) to the backup volume 420 (target) may be referred to as a safeguarded relation. In certain embodiments, the backup target data structure 422 resides on the backup volume 420.

Also, for a recovery copy operation from the production volume 400 (source) to the recovery volume 440 (target), there is a recovery copy relationship between the production volume 400 and the recovery volume 440, there is a recovery target data structure 442 that indicates whether storage locations on the recovery volume 440 have current data copied over from the production volume 400 or the backup volume, and there is a recovery copy data structure 444 that indicates whether storage locations on the recovery volume 440 have current data copied over from the backup volume 400. In certain embodiments, the recovery target data structure 442 and the recovery copy data structure 444 reside on the recovery volume 440. In certain embodiments, for the recovery copy relationship, there is also an internal copy relationship from the backup volume 420 (source) to the recovery volume 440 (backup) and there is a backup internal data structure 424 that is used to indicate where data is to be retrieved for the recovery volume 440.

Also, embodiments provide a new copy operation, a recovery copy command. In certain embodiments, the recovery copy command identifies a production volume (source), a recovery volume (target), and a recovery sequence number identifying data of a consistency group (i.e., at a point in time) to recover to.

Figure 5A:
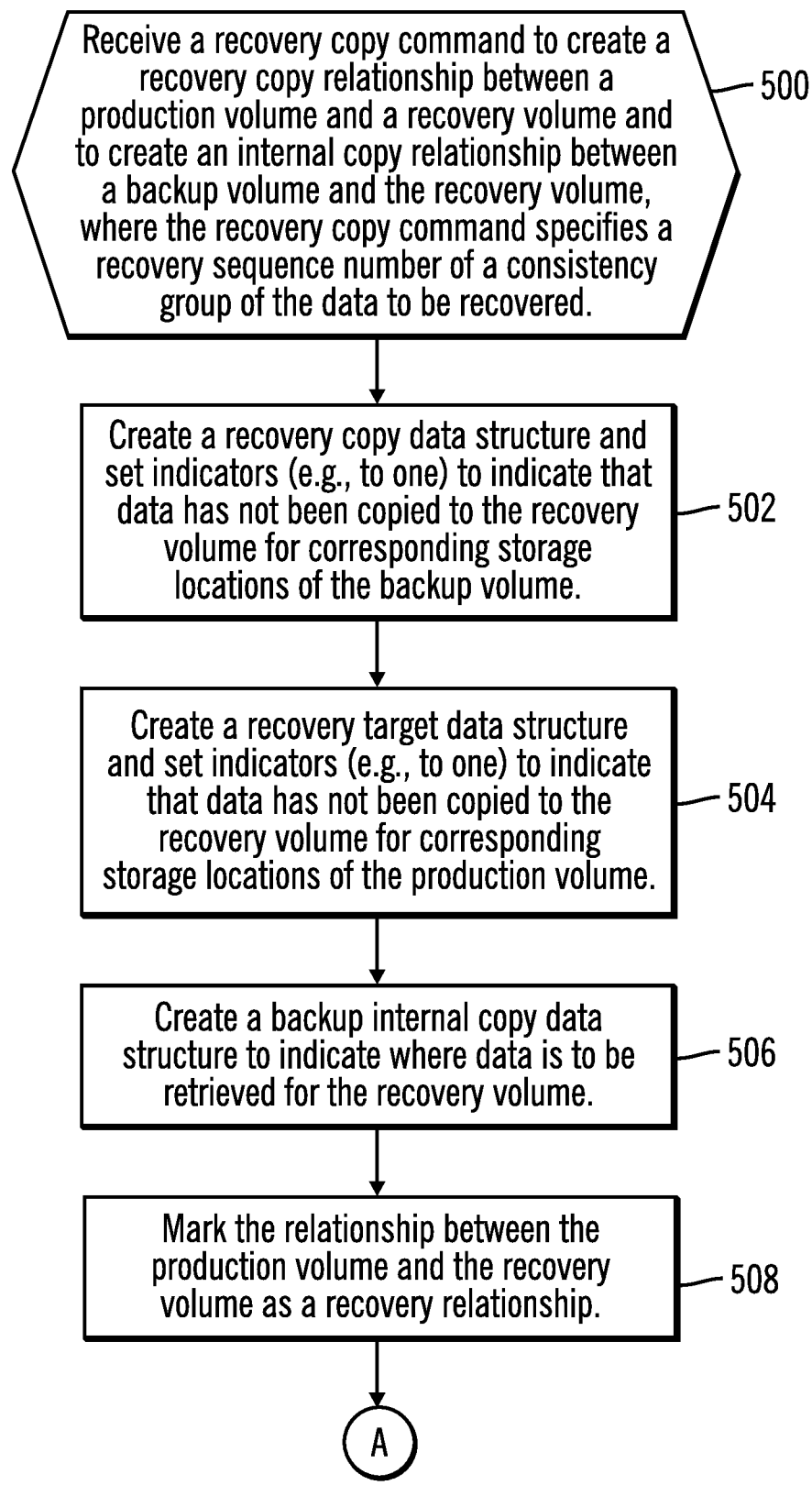
FIGS. 5A and 5B illustrate, in a flowchart, operations for beginning a recovery copy command in accordance with certain embodiments.
Figure 5B:
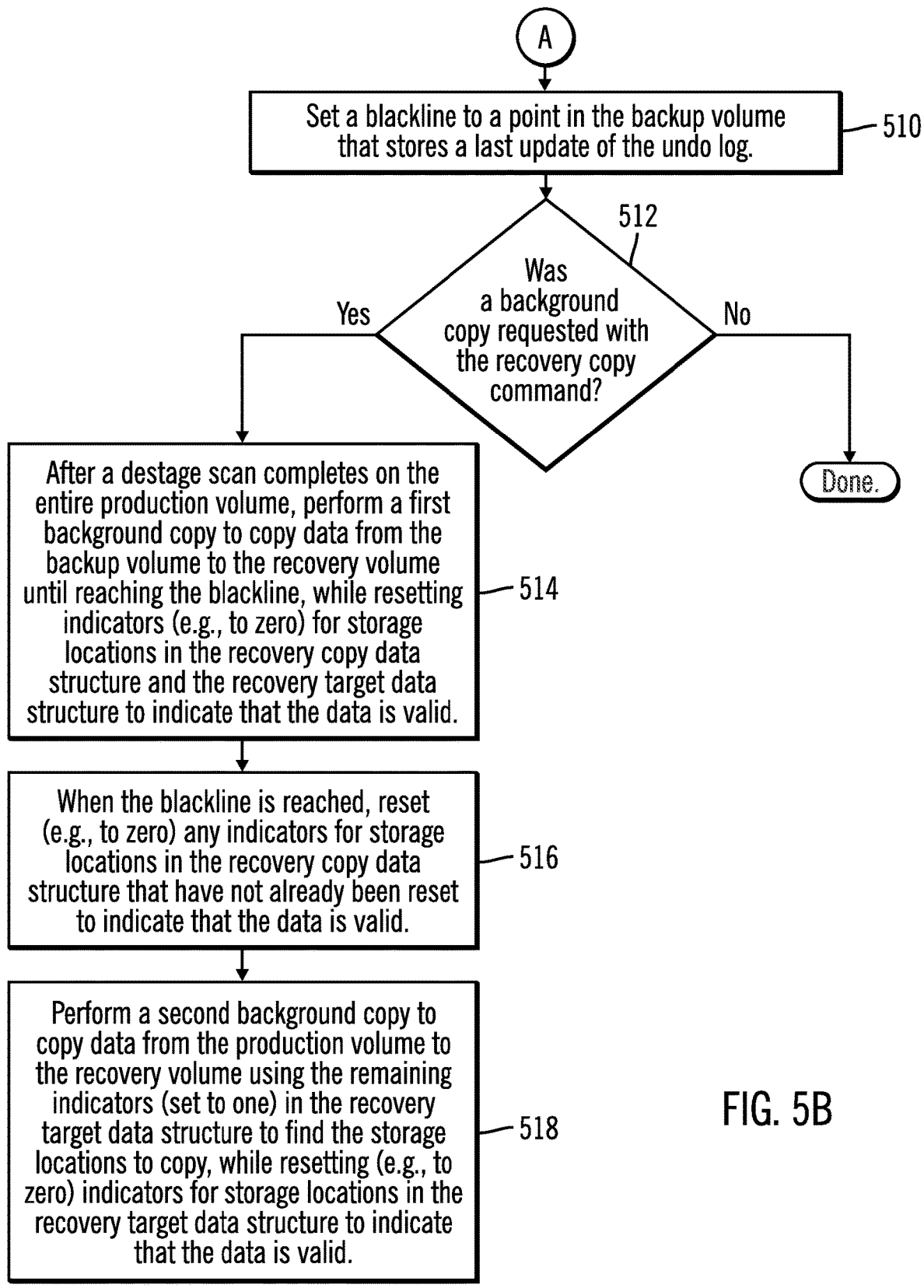

FIGS. 5A and 5B illustrate, in a flowchart, operations for beginning a recovery copy command in accordance with certain embodiments. In block 500, the storage manager 230 receives a recovery copy command to create a recovery copy relationship between a production volume and a recovery volume and to create an internal copy relationship between a backup volume and the recovery volume, where the recovery copy command specifies a recovery sequence number of a consistency group of the data to be recovered. In certain embodiments, the recovery copy command also indicates whether a background copy is to be performed.

In block 502, the storage manager 230 creates a recovery copy data structure and sets indicators (e.g., to one) to indicate that data has not been copied to the recovery volume for corresponding storage locations of the production volume. In block 504, the storage manager 230 creates a recovery target data structure and sets indicators (e.g., to one) to indicate that data has not been copied to the recovery volume for corresponding storage locations of the production volume. In block 506, the storage manager 230 creates a backup internal copy data structure to indicate where data is to be retrieved for the recovery volume.

In block 508, the storage manager 230 marks the relationship between the production volume and the recovery volume as a recovery relationship. From block 508, (FIG. 5A), processing continues to block 510 (FIG. 5B).

In block 510, the storage manager 230 sets a blackline to a point in the backup volume that stores a last update of the undo log. In block 512, the storage manager 230 determines whether a background copy was requested with the recovery copy command. If so, processing continues to block 514, otherwise, processing is done. In certain embodiments, the background copy is optional and may be specified as part of the recovery copy command (received in block 500). In certain embodiments, the recovery copy command enables a point-in-time copy from the backup volume to the production volume with COPY or NOCOPY set. The COPY option indicates that background copy is to be performed, while the NOCOPY option indicates that no background copy is to be performed.

In block 514, after a destage scan completes on the entire production volume, the storage manager 230 performs a first background copy to copy data from the backup volume to the recovery volume until reaching the blackline, while resetting indicators (e.g., to zero) for storage locations in the recovery copy data structure and the recovery target data structure to indicate that the data is valid.

In block 516, when the blackline is reached, the storage manager 230 resets (e.g., to zero) any indicators for storage locations in the recovery copy data structure that have not already been reset to indicate that the data is valid.

In block 518, the storage manager 230 performs a second background copy to copy data from the production volume to the recovery volume using the remaining indicators (set to one) in the recovery target data structure to find the storage locations to copy, while resetting (e.g., to zero) indicators for storage locations in the recovery target data structure to indicate that the data is valid.

Figure 6A:
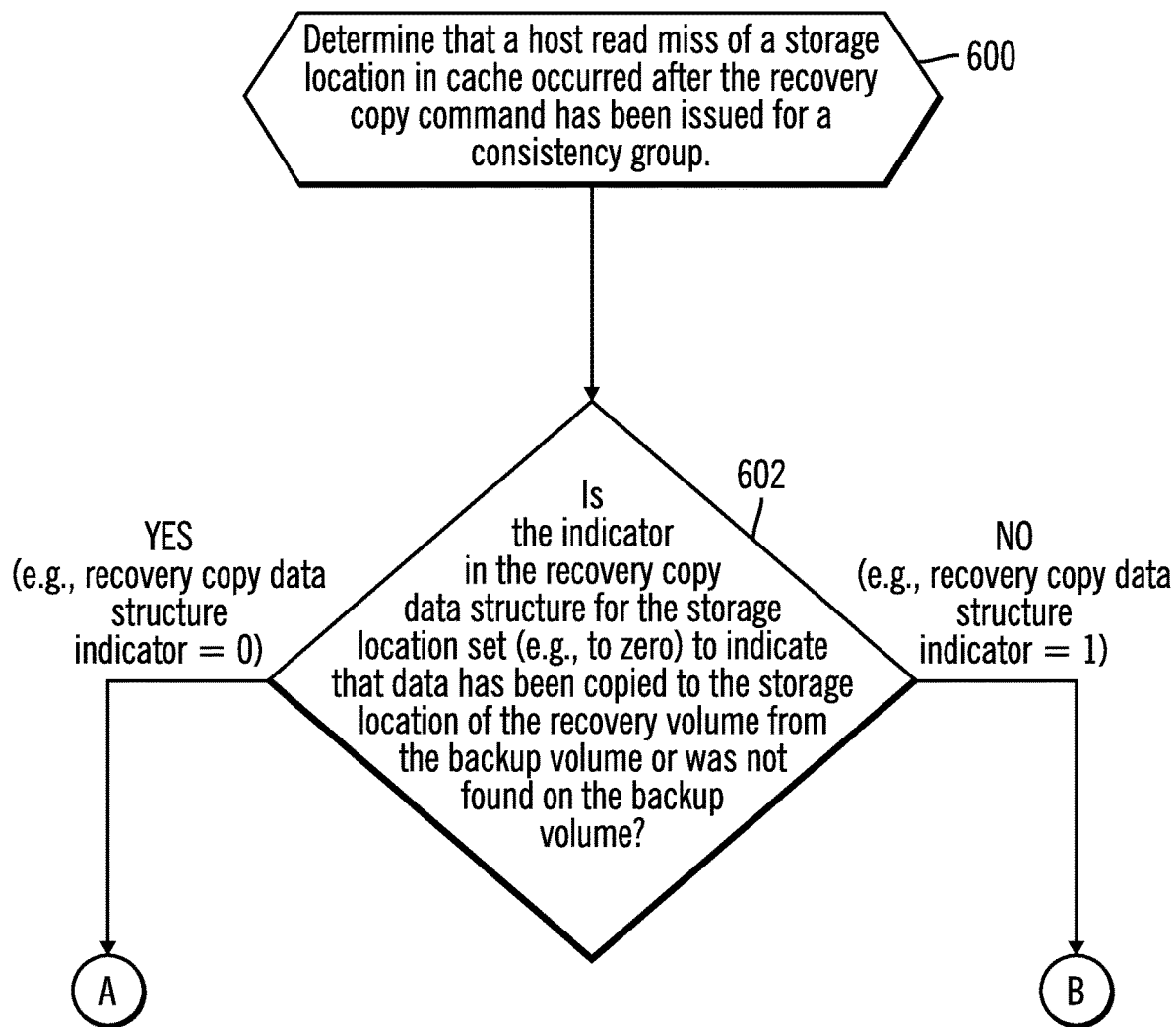
FIGS. 6A, 6B, 6C, and 6D illustrate, in a flowchart, operations for processing a host read miss of cache while there is a recovery relationship in accordance with certain embodiments.
Figure 6B:
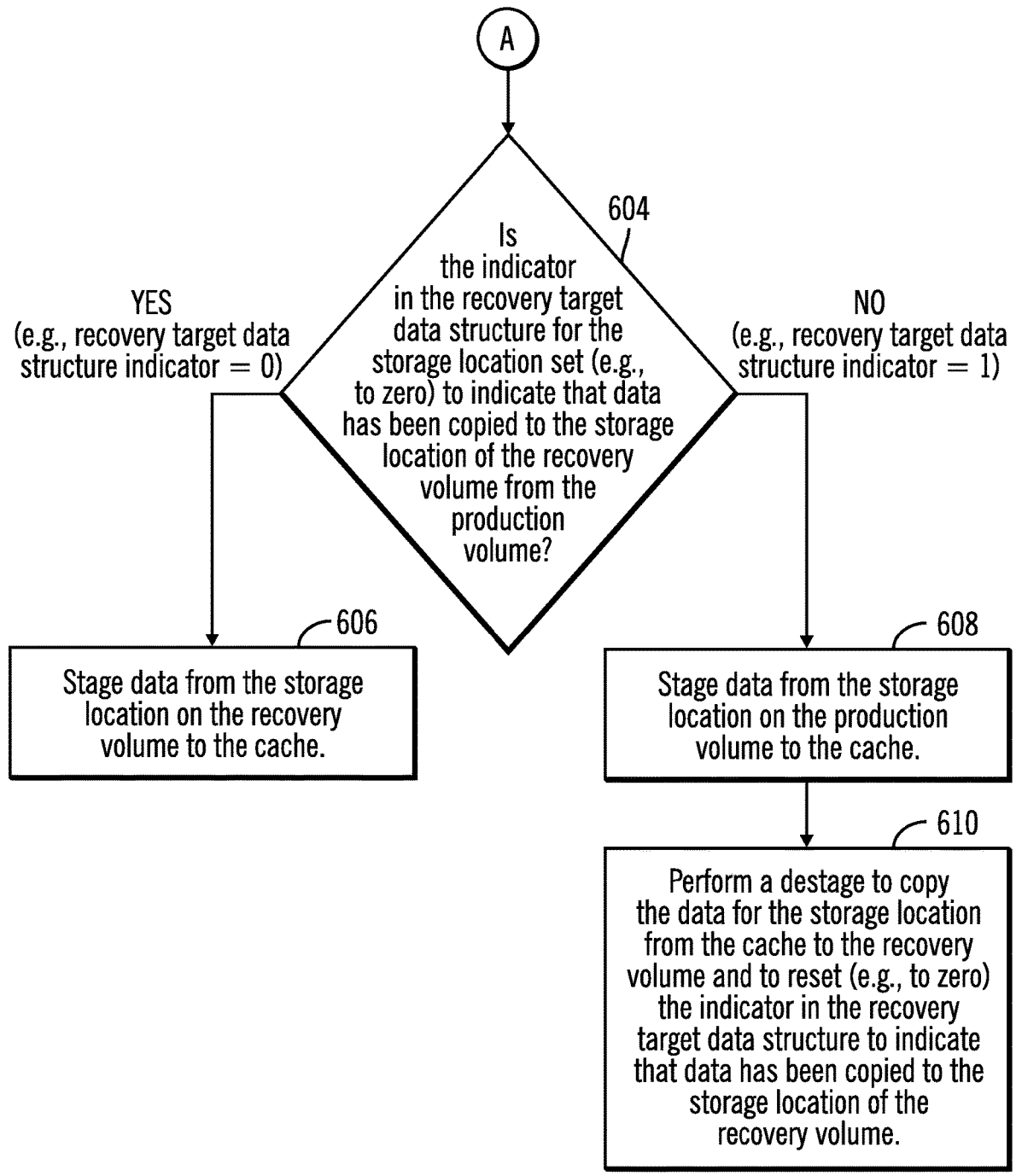
Figure 6C:
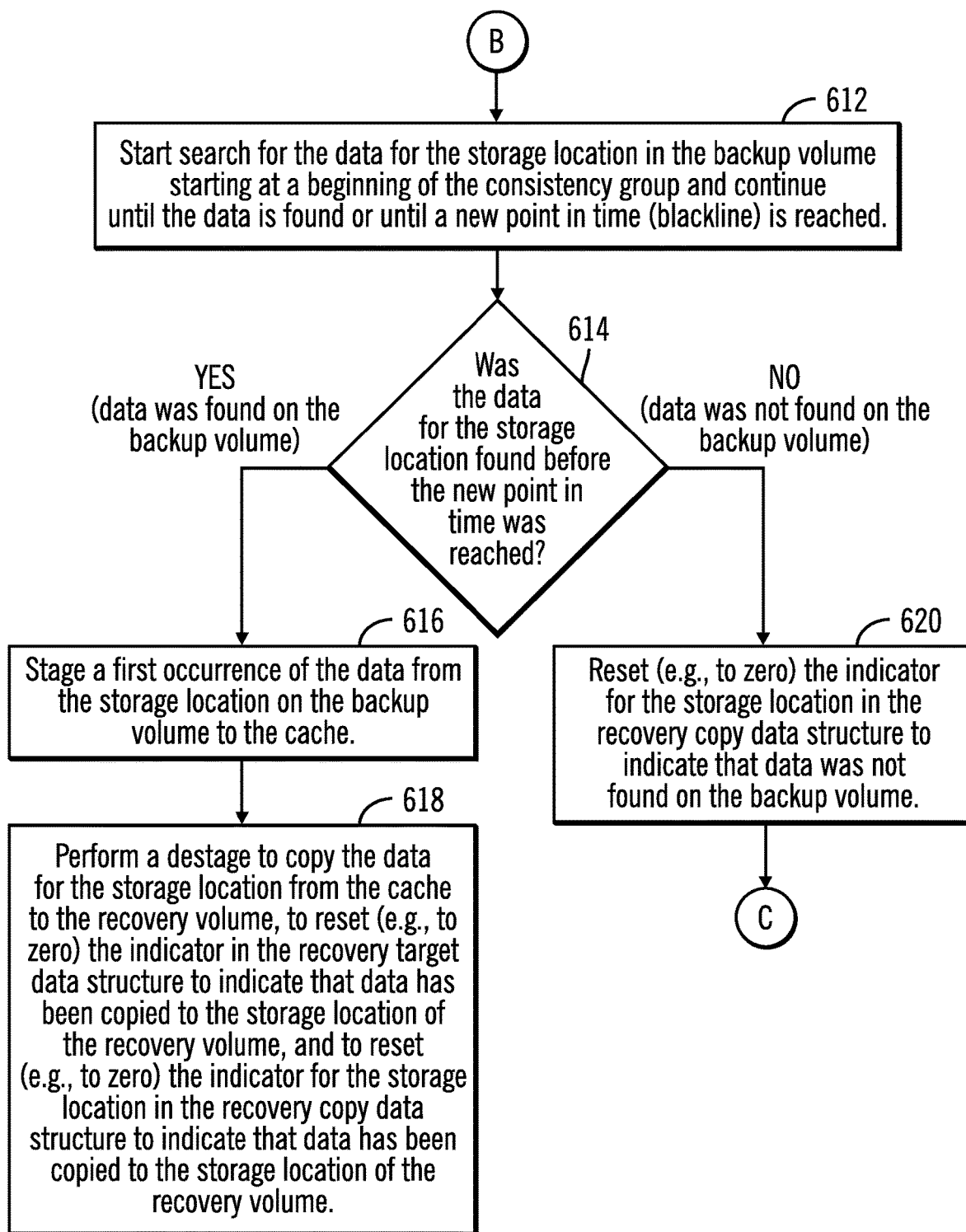

FIGS. 6A, 6B, 6C, and 6D illustrate, in a flowchart, operations for processing a host read miss of cache while there is a recovery relationship in accordance with certain embodiments. Control begins at block 600 with the storage manager 230 determining that a host read miss of a storage location in cache occurred while there is a recovery relationship for a recovery copy command for a consistency group. In certain embodiments, the host issues a read operation for a storage location in a cache. However, the data is not in the cache, therefore data needs to be staged to the cache. In block 602, the storage manager 230 determines whether an indicator in the recovery copy data structure for the storage location is set (e.g., to zero) to indicate that data has been copied to the storage location of the recovery volume from the backup volume or was not found on the backup volume. If so, processing continues to block 604 (FIG. 6B), otherwise, processing continues to block 612 (FIG. 6C). In certain embodiments, the indicator is set to zero for a storage location in the recovery copy data structure if data was copied from the backup volume or not found in the backup volume for that storage location.

In block 604, the storage manager 230 determines whether the indicator in the recovery target data structure for the storage location is set (e.g., to zero) to indicate that data has been copied to the storage location of the recovery volume from the production volume. If so, processing continues to block 606, otherwise, processing continues to block 608.

In block 606, the storage manager 230 stages data from the storage location on the recovery volume to the cache. Once data for the storage location is staged to the cache, the host read of the cache may be completed.

In block 608, the storage manager 230 stages data from the storage location on the production volume to the cache. In block 610, the storage manager 230 performs a destage to copy the data for the storage location from the cache to the recovery volume and to reset (e.g., to zero) the indicator in the recovery target data structure to indicate that data has been copied to the storage location of the recovery volume. As indicated from the flow from block 602, the indicator for the storage location in the recovery copy data structure is zero and does not have to be reset. Although certain embodiments use a sync destage that is synchronous, other embodiments may use an async destage that is not synchronous.

In block 612, the storage manager 230 starts a search for the data for the storage location in the backup volume starting at a beginning of the consistency group and continues until the data is found or until a new point in time (blackine) is reached.

In block 614, the storage manager 230 determines whether the data for the storage location was found before the new point in time was reached. If so, processing continues to block 616, otherwise, processing continues to block 620.

In block 616, the storage manager 230 stages a first occurrence of the data from the storage location on the backup volume to the cache. In certain embodiments, the storage location may exist multiple times on the backup volume, and embodiments find the first occurrence for staging. In block 618, the storage manager 230 performs a destage to copy the data for the storage location from the cache to the recovery volume, to reset (e.g., to zero) the indicator in the recovery target data structure to indicate that data has been copied to the storage location of the recovery volume, and to reset (e.g., to zero) the indicator for the storage location in the recovery copy data structure to indicate that data has been copied to the storage location of the recovery volume. Although certain embodiments use a sync destage that is synchronous, other embodiments may use an async destage that is not synchronous.

Figure 6D:
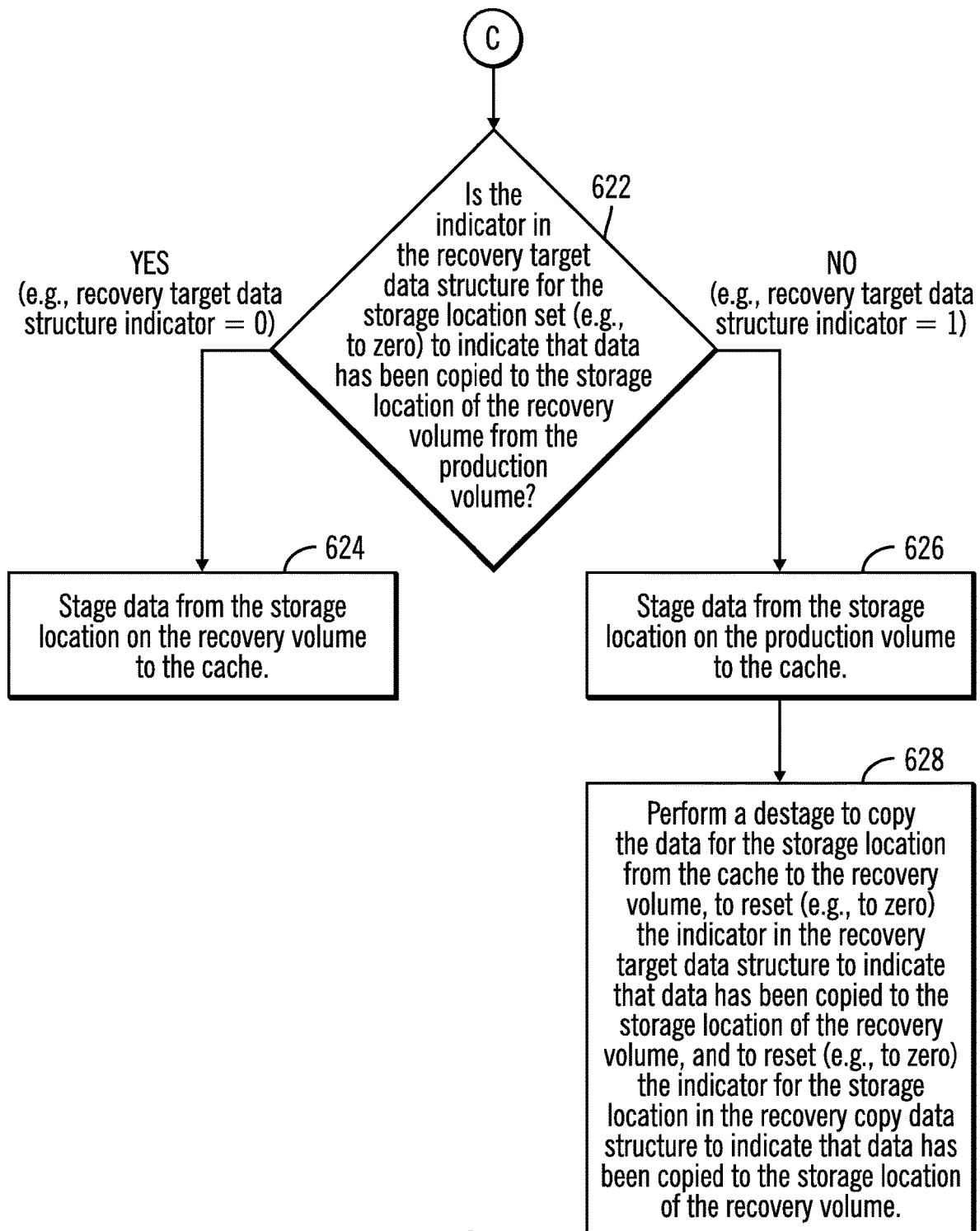

In block 620, the storage manager 230 resets (e.g., to zero) the indicator for the storage location in the recovery copy data structure to indicate that data was not found on the backup volume. From block 620 (FIG. 6C), processing continues to block 622 (FIG. 6D).

In block 622, the storage manager 230 determines whether the indicator in the recovery target data structure for the storage location is set (e.g., to zero) to indicate that data has been copied to the storage location of the recovery volume from the production volume. If so, processing continues to block 624, otherwise, processing continues to block 626.

In block 624, the storage manager 230 stages data from the storage location on the recovery volume to the cache.

In block 626, the storage manager 230 stages data from the storage location on the production volume to the cache. In block 628, the storage manager 230 performs a destage to copy the data for the storage location from the cache to the recovery volume, to reset (e.g., to zero) the indicator in the recovery target data structure to indicate that data has been copied to the storage location of the recovery volume, and to reset (e.g., to zero) the indicator for the storage location in the recovery copy data structure to indicate that data has been copied to the storage location of the recovery volume. Although certain embodiments use a sync destage that is synchronous, other embodiments may use an async destage that is not synchronous.

In certain embodiments, if the indicator for a storage location in the recovery copy data structure is zero and the indicator for the storage location in the recovery target data structure is zero, then the current data is on the recovery volume. In certain embodiments, a write to the recovery volume may have copied data from the production volume to the recovery volume. However, this data may not be the requested version specified in the recovery copy command, but this data is temporarily stored on the recovery volume. Therefore, embodiments do not rely on the recovery target data structure alone as the requested version may be on the backup volume.

Figure 7:
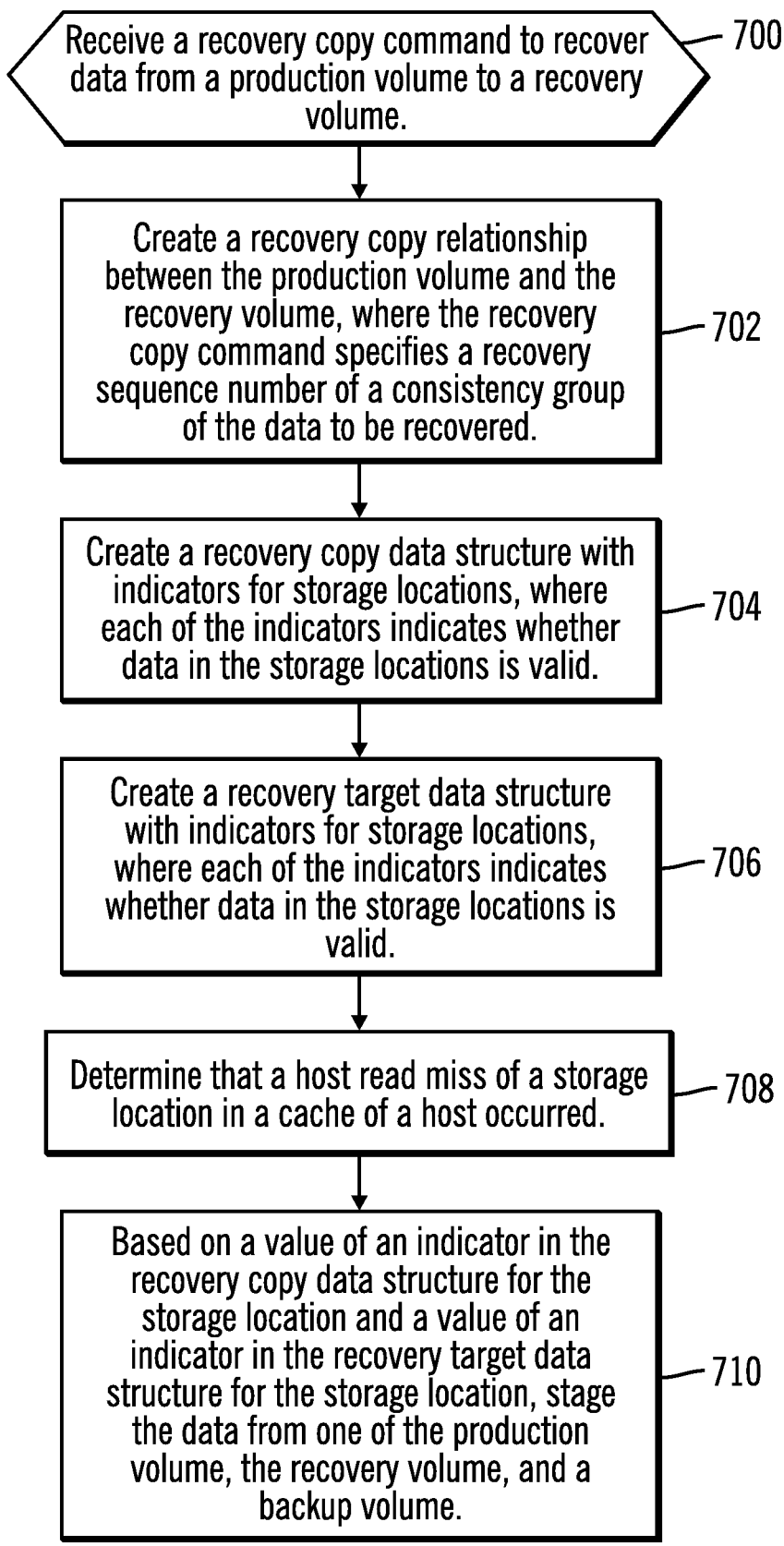
FIG. 7 illustrates, in a flowchart, operations for selecting one of a recovery volume, a backup volume, and a production volume for staging data to a cache in accordance with certain embodiments.

FIG. 7 illustrates, in a flowchart, operations for selecting one of a recovery volume, a backup volume, and a production volume for staging data to a cache in accordance with certain embodiments. Control begins at block 700 with the storage manager 230 receiving a recovery copy command to recover data from a production volume to a recovery volume. In block 702, the storage manager 230 creates a recovery copy relationship between the production volume and the recovery volume, where the recovery copy command specifies a recovery sequence number of a consistency group of the data to be recovered. In block 704, the storage manager 230 creates a recovery copy data structure with indicators for storage locations, where each of the indicators indicates whether data in the storage locations is valid. In block 706, the storage manager 230 creates a recovery target data structure with indicators for storage locations, where each of the indicators indicates whether data in the storage locations is valid. In block 708, the storage manager 230 determines that a host read miss of a storage location in a cache of a host occurred. In block 710, based on a value of an indicator in the recovery copy data structure for the storage location and a value of an indicator in the recovery target data structure for the storage location, the storage manager 230 stages the data from one of the production volume, the backup volume, and the recovery volume.

Embodiments advantageously improve efficiency of storage location (e.g., track) lookup in backup volume using a recovery copy data structure that indicates whether particular data needs to be acquired by scanning the backup volume or the data is already present in the production volume or the recovery volume. In certain embodiments, the indicators (e.g., bits) in the recovery copy data structure are set to all ones when a recovery volume relationship is created, where each indicator in the recovery copy data structure represents a storage location (e.g., track) of data on the safeguarded backup volume. Then, a corresponding indicator (e.g., bit) in the recovery copy data structure is set to zero when a storage location (e.g., track) is found and copied to the recovery volume. Then, embodiments advantageously check indicator values in the recovery copy data structure for re-reference of a chosen storage location in a chosen time version.

Figure 8:
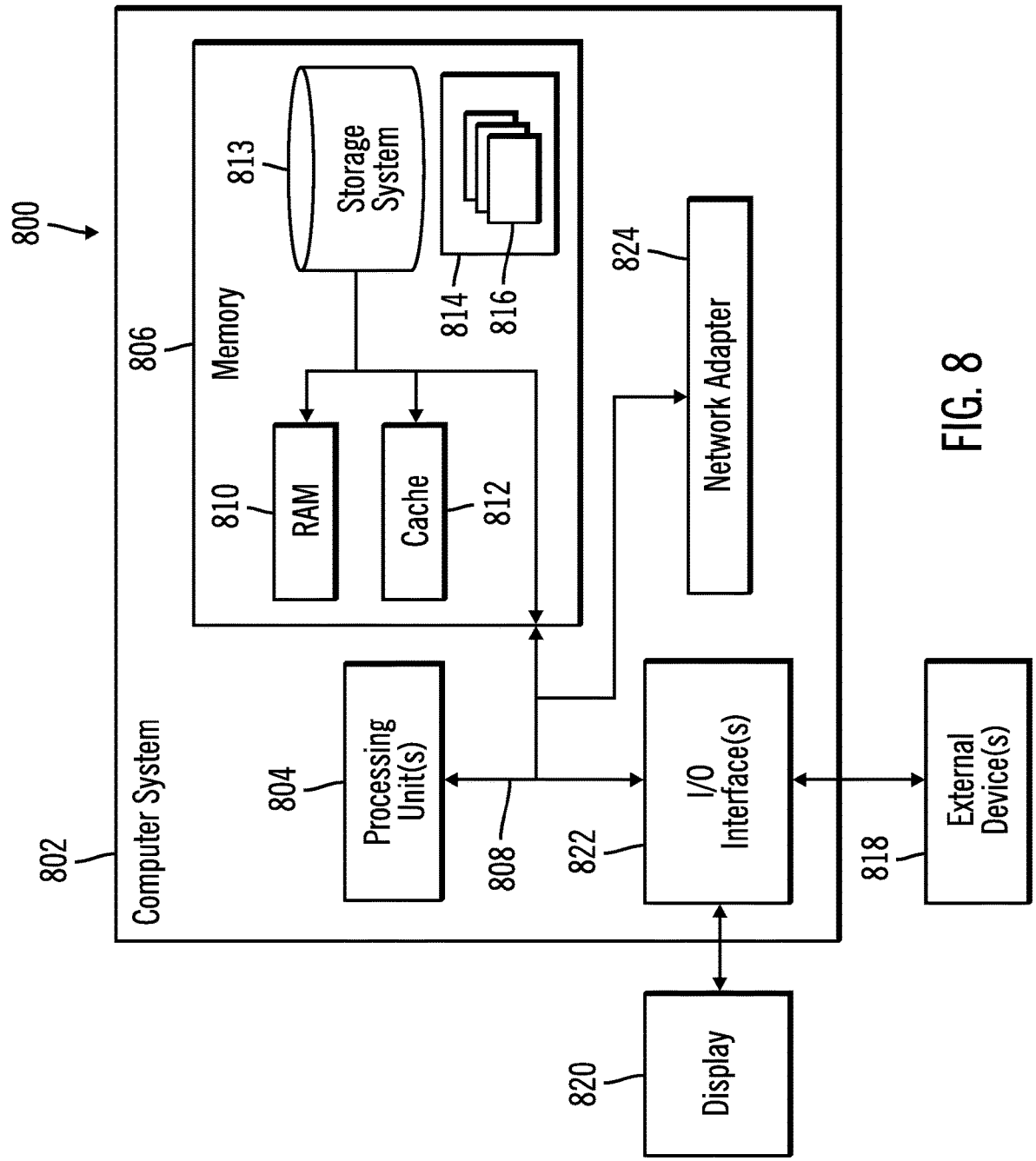
FIG. 8 illustrates a computing architecture in which the components of FIG. 1 may be implemented in accordance with certain embodiments.

FIG. 8 illustrates a computing architecture in which the components of FIG. 1 may be implemented in accordance with certain embodiments. In certain embodiments, the hosts 100a, 100b, . . . 100n and the storage controller 120 may implement computer architecture 800.

Computer system/server 802 may be described in the general context of computer system executable instructions, such as program modules, being executed by a computer system. Generally, program modules may include routines, programs, objects, components, logic, data structures, and so on that perform particular tasks or implement particular abstract data types. Computer system/server 802 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, the computer system/server 802 is shown in the form of a general-purpose computing device. The components of computer system/server 802 may include, but are not limited to, one or more processors or processing units 804, a system memory 806, and a bus 808 that couples various system components including system memory 806 to processor 804. Bus 808 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 802 typically includes a variety of computer system readable media. Such media may be any available media that is accessible by computer system/server 802, and it includes both volatile and non-volatile media, removable and non-removable media.

System memory 806 can include computer system readable media in the form of volatile memory, such as random access memory (RAM) 811 and/or cache memory 812. Computer system/server 802 may further include other removable/non-removable, volatile/non-volatile computer system storage media. By way of example only, storage system 813 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 808 by one or more data media interfaces. As will be further depicted and described below, memory 806 may include at least one program product having a set (e.g., at least one) of program modules that are configured to carry out the functions of embodiments of the invention.

Program/utility 814, having a set (at least one) of program modules 816, may be stored in memory 806 by way of example, and not limitation, as well as an operating system, one or more application programs, other program modules, and program data. Each of the operating system, one or more application programs, other program modules, and program data or some combination thereof, may include an implementation of a networking environment. The components of the computer 802 may be implemented as program modules 816 which generally carry out the functions and/or methodologies of embodiments of the invention as described herein. The systems of FIG. 1 may be implemented in one or more computer systems 802, where, if they are implemented in multiple computer systems 802, then the computer systems may communicate over a network.

Computer system/server 802 may also communicate with one or more external devices 818 such as a keyboard, a pointing device, a display 820, etc.; one or more devices that enable a user to interact with computer system/server 802; and/or any devices (e.g., network card, modem, etc.) that enable computer system/server 802 to communicate with one or more other computing devices. Such communication can occur via Input/Output (I/O) interfaces 822. Still yet, computer system/server 802 can communicate with one or more networks such as a local area network (LAN), a general wide area network (WAN), and/or a public network (e.g., the Internet) via network adapter 824. As depicted, network adapter 824 communicates with the other components of computer system/server 802 via bus 808. It should be understood that although not shown, other hardware and/or software components could be used in conjunction with computer system/server 802. Examples, include, but are not limited to: microcode, device drivers, redundant processing units, external disk drive arrays, RAID systems, tape drives, and data archival storage systems, etc.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

Cloud Embodiments

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 9:
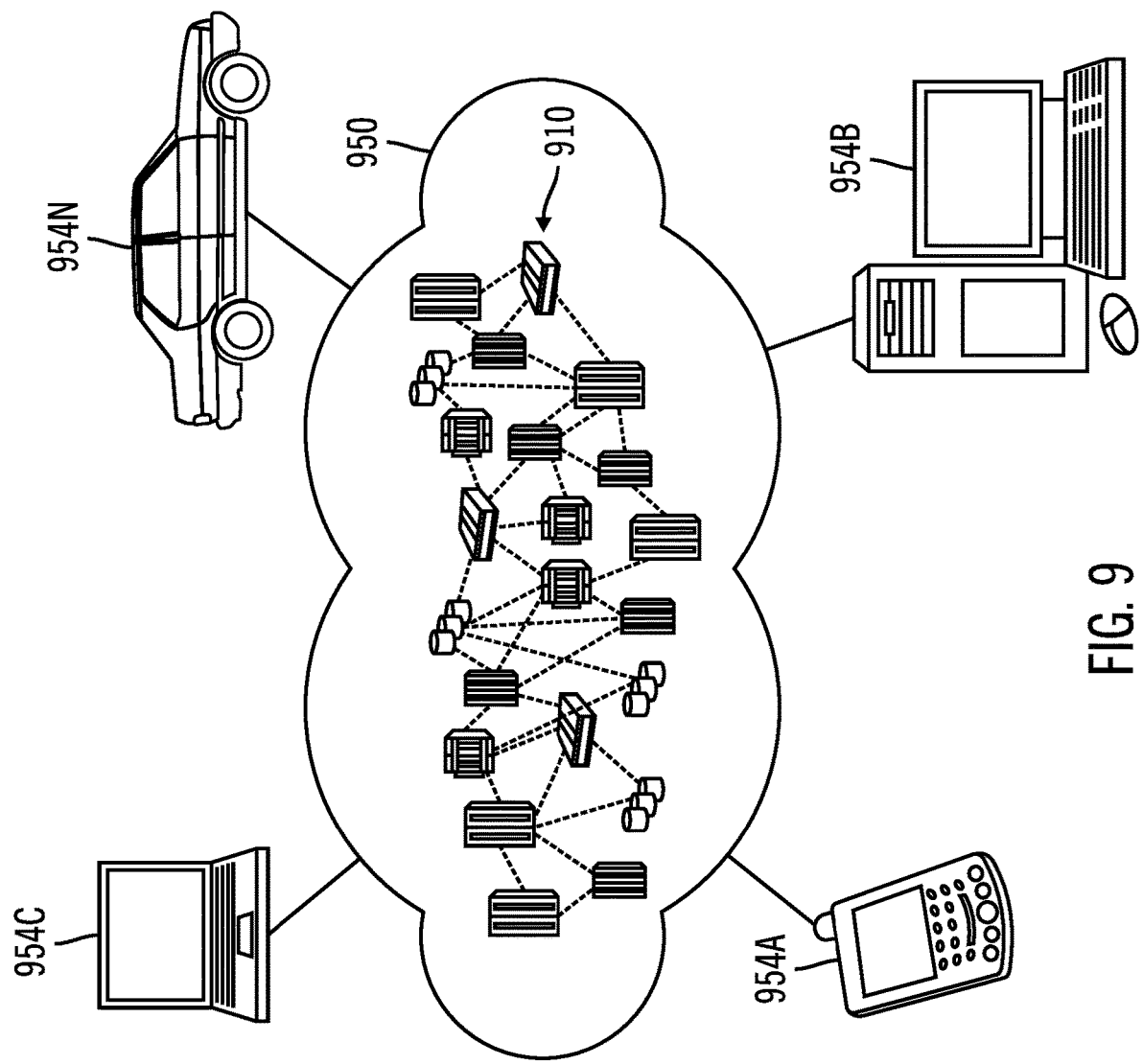
FIG. 9 illustrates a cloud computing environment in accordance with certain embodiments.

Referring now to FIG. 9, illustrative cloud computing environment 950 is depicted. As shown, cloud computing environment 950 includes one or more cloud computing nodes 910 with which local computing devices used by cloud consumers, such as, for example, personal digital assistant (PDA) or cellular telephone 954A, desktop computer 954B, laptop computer 954C, and/or automobile computer system 954N may communicate. Nodes 910 may communicate with one another. They may be grouped (not shown) physically or virtually, in one or more networks, such as Private, Community, Public, or Hybrid clouds as described hereinabove, or a combination thereof. This allows cloud computing environment 950 to offer infrastructure, platforms and/or software as services for which a cloud consumer does not need to maintain resources on a local computing device. It is understood that the types of computing devices 954A-N shown in FIG. 9 are intended to be illustrative only and that computing nodes 910 and cloud computing environment 950 can communicate with any type of computerized device over any type of network and/or network addressable connection (e.g., using a web browser).

Referring now to FIG. 10, a set of functional abstraction layers provided by cloud computing environment 950 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 1060 includes hardware and software components. Examples of hardware components include: mainframes 1061; RISC (Reduced Instruction Set Computer) architecture based servers 1062; servers 1063; blade servers 1064; storage devices 1065; and networks and networking components 1066. In some embodiments, software components include network application server software 1067 and database software 1068.

Virtualization layer 1070 provides an abstraction layer from which the following examples of virtual entities may be provided: virtual servers 1071; virtual storage 1072; virtual networks 1073, including virtual private networks; virtual applications and operating systems 1074; and virtual clients 1075.

In one example, management layer 1080 may provide the functions described below. Resource provisioning 1081 provides dynamic procurement of computing resources and other resources that are utilized to perform tasks within the cloud computing environment. Metering and Pricing 1082 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1083 provides access to the cloud computing environment for consumers and system administrators. Service level management 1084 provides cloud computing resource allocation and management such that required service levels are met. Service Level Agreement (SLA) planning and fulfillment 1085 provide pre-arrangement for, and procurement of, cloud computing resources for which a future requirement is anticipated in accordance with an SLA.

Workloads layer 1090 provides examples of functionality for which the cloud computing environment may be utilized. Examples of workloads and functions which may be provided from this layer include: mapping and navigation 1091; software development and lifecycle management 1092; virtual classroom education delivery 1093; data analytics processing 1094; transaction processing 1095; and performing a recovery copy command using a recovery copy data structure for a backup volume lookup 1096.

Thus, in certain embodiments, software or a program, implementing performing of a recovery copy command using a recovery copy data structure for a backup volume lookup in accordance with embodiments described herein, is provided as a service in a cloud infrastructure.

In certain embodiments, the components of FIG. 1 are part of a cloud infrastructure. For example, the hosts, the storage controller, production storage containing the production volume, backup storage containing the backup volume, and recovery storage containing the recovery volume are in a cloud infrastructure. In other embodiments, the components of FIG. 1 are not part of a cloud infrastructure.

Additional Embodiment Details

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer program product, the computer program product comprising a computer readable storage medium having program code embodied therewith, the program code executable by at least one processor to perform:
   in response to receiving a recovery copy command to recover data from a production volume to a recovery volume, wherein the recovery copy command specifies a recovery sequence number of a consistency group of the data to be recovered,
       creating a recovery copy relationship between the production volume and the recovery volume and an internal copy relationship between a backup volume and the recovery volume;
       creating a recovery copy data structure with indicators for storage locations of the recovery volume, wherein each of the indicators in the recovery copy data structure corresponds to each of the storage locations of the recovery volume and indicates whether data in that storage location of the recovery volume is valid;
       creating a recovery target data structure with indicators for the storage locations of the recovery volume, wherein each of the indicators in the recovery target data structure corresponds to each of the storage locations of the recovery volume and indicates whether data in that storage location of the recovery volume is valid;
       receiving a read operation to read data for a storage location of a cache; and
       based on a value of an indicator in the recovery copy data structure for the storage location of the recovery volume and a value of an indicator in the recovery target data structure for the storage location of the recovery volume, staging the data from one of the production volume, the recovery volume, and the backup volume to the cache, wherein,
           in response to determining that the indicator in the recovery copy data structure for the storage location of the recovery volume is set to indicate that the data has been copied to the storage location of the recovery volume from the backup volume or was not found on the backup volume, and,
           in response to determining that the indicator in the recovery target data structure for the storage location of the recovery volume is set to indicate that the data has been copied to the storage location of the recovery volume from the production volume, staging the data from the recovery volume to the cache.

2. The computer program product of claim 1, wherein the program code is executable by the at least one processor to perform:
   in response to determining that the indicator in the recovery copy data structure for the storage location of the recovery volume is set to indicate that the data has been copied to the storage location of the recovery volume from the backup volume or was not found on the backup volume, and, in response to determining that the indicator in the recovery target data structure for the storage location of the recovery volume is set to indicate that the data has not been copied to the storage location of the recovery volume from the production volume,
       staging the data from the production volume to the cache;
       destaging the data from the cache to the recovery volume;
       resetting the indicator for the storage location in the recovery target data structure to indicate that the data is valid for that storage location; and
       resetting the indicator for the storage location in the recovery copy data structure to indicate that the data is valid for that storage location.

3. The computer program product of claim 1, wherein the program code is executable by the at least one processor to perform:
   in response to determining that the indicator in the recovery copy data structure for the storage location of the recovery volume is set to indicate that the data has not been copied to the storage location of the recovery volume from the backup volume and determining that the data is found on the backup volume,
       staging the data from the backup volume to the cache;
       destaging the data from the cache to the recovery volume;
       resetting the indicator for the storage location in the recovery target data structure to indicate that the data is valid for that storage location; and
       resetting the indicator for the storage location in the recovery copy data structure to indicate that the data is valid for that storage location.

4. The computer program product of claim 1, wherein the program code is executable by the at least one processor to perform:
   in response to determining that the indicator in the recovery copy data structure for the storage location of the recovery volume is set to indicate that the data has not been copied to the storage location of the recovery volume from the backup volume and determining that the data is not found on the backup volume,
       resetting the indicator for the storage location in the recovery copy data structure to indicate that the data was not found on the backup volume; and in response to determining that the indicator in the recovery target data structure for the storage location of the recovery volume is set to indicate that the data has been copied to the storage location of the recovery volume from the production volume, staging the data from the recovery volume to the cache.

5. The computer program product of claim 1, wherein the program code is executable by the at least one processor to perform:
in response to determining that the indicator in the recovery copy data structure for the storage location of the recovery volume is set to indicate that the data has not been copied to the storage location of the recovery volume from the backup volume and determining that the data is not found on the backup volume,
resetting the indicator for the storage location in the recovery copy data structure to indicate that the data was not found on the backup volume; and
in response to determining that the indicator in the recovery target data structure for the storage location of the recovery volume is set to indicate that the data has not been copied to the storage location of the recovery volume from the production volume,
staging the data from the production volume to the cache;
destaging the data from the cache to the recovery volume;
resetting the indicator for the storage location in the recovery target data structure to indicate that the data is valid for that storage location; and
resetting the indicator for the storage location in the recovery copy data structure to indicate that the data is valid for that storage location.

6. The computer program product of claim 1, wherein a storage controller, production storage containing the production volume, backup storage containing the backup volume, recovery storage containing the recovery volume, and the cache are in a cloud infrastructure.

7. A computer system, comprising:
one or more processors, one or more computer-readable memories and one or more computer-readable, tangible storage devices; and
program instructions, stored on at least one of the one or more computer-readable, tangible storage devices for execution by at least one of the one or more processors via at least
one of the one or more computer-readable memories, to perform operations comprising:
in response to receiving a recovery copy command to recover data from a production volume to a recovery volume, wherein the recovery copy command specifies a recovery sequence number of a consistency group of the data to be recovered,
creating a recovery copy relationship between the production volume and the recovery volume and an internal copy relationship between a backup volume and the recovery volume;
creating a recovery copy data structure with indicators for storage locations of the recovery volume, wherein each of the indicators in the recovery copy data structure corresponds to each of the storage locations of the recovery volume and indicates whether data in that storage location of the recovery volume is valid;
creating a recovery target data structure with indicators for the storage locations of the recovery volume, wherein each of the indicators in the recovery target data structure corresponds to each of the storage locations of the recovery volume and indicates whether data in that storage location of the recovery volume is valid;
receiving a read operation for a storage location of a cache; and
based on a value of an indicator in the recovery copy data structure for the storage location of the recovery volume and a value of an indicator in the recovery target data structure for the storage location of the recovery volume, staging the data from one of the production volume, the recovery volume, and the backup volume to the cache, wherein,
in response to determining that the indicator in the recovery copy data structure for the storage location of the recovery volume is set to indicate that the data has been copied to the storage location of the recovery volume from the backup volume or was not found on the backup volume, and,
in response to determining that the indicator in the recovery target data structure for the storage location of the recovery volume is set to indicate that the data has been copied to the storage location of the recovery volume from the production volume, staging the data from the recovery volume to the cache.

8. The computer system of claim 7, wherein the operations further comprise:
in response to determining that the indicator in the recovery copy data structure for the storage location of the recovery volume is set to indicate that the data has been copied to the storage location of the recovery volume from the backup volume or was not found on the backup volume, and, in response to determining that the indicator in the recovery target data structure for the storage location of the recovery volume is set to indicate that the data has not been copied to the storage location of the recovery volume from the production volume,
staging the data from the production volume to the cache;
destaging the data from the cache to the recovery volume;
resetting the indicator for the storage location in the recovery target data structure to indicate that the data is valid for that storage location; and
resetting the indicator for the storage location in the recovery copy data structure to indicate that the data is valid for that storage location.

9. The computer system of claim 7, wherein the operations further comprise:
in response to determining that the indicator in the recovery copy data structure for the storage location of the recovery volume is set to indicate that the data has not been copied to the storage location of the recovery volume from the backup volume and determining that the data is found on the backup volume,
staging the data from the backup volume to the cache;
destaging the data from the cache to the recovery volume;
resetting the indicator for the storage location in the recovery target data structure to indicate that the data is valid for that storage location; and
resetting the indicator for the storage location in the recovery copy data structure to indicate that the data is valid for that storage location.

10. The computer system of claim 7, wherein the operations further comprise:
  in response to determining that the indicator in the recovery copy data structure for the storage location of the recovery volume is set to indicate that the data has not been copied to the storage location of the recovery volume from the backup volume and determining that the data is not found on the backup volume,
    resetting the indicator for the storage location in the recovery copy data structure to indicate that the data was not found on the backup volume; and
  in response to determining that the indicator in the recovery target data structure for the storage location of the recovery volume is set to indicate that the data has been copied to the storage location of the recovery volume from the production volume, staging the data from the recovery volume to the cache.

11. The computer system of claim 7, wherein the operations further comprise:
  in response to determining that the indicator in the recovery copy data structure for the storage location of the recovery volume is set to indicate that the data has not been copied to the storage location of the recovery volume from the backup volume and determining that the data is not found on the backup volume,
    resetting the indicator for the storage location in the recovery copy data structure to indicate that the data was not found on the backup volume; and
  in response to determining that the indicator in the recovery target data structure for the storage location of the recovery volume is set to indicate that the data has not been copied to the storage location of the recovery volume from the production volume,
    staging the data from the production volume to the cache;
    destaging the data from the cache to the recovery volume;
    resetting the indicator for the storage location in the recovery target data structure to indicate that the data is valid for that storage location; and
    resetting the indicator for the storage location in the recovery copy data structure to indicate that the data is valid for that storage location.

12. The computer system of claim 7, wherein a storage controller, production storage containing the production volume, backup storage containing the backup volume, recovery storage containing the recovery volume, and the cache are in a cloud infrastructure.

13. A computer-implemented method, comprising:
  in response to receiving a recovery copy command to recover data from a production volume to a recovery volume, wherein the recovery copy command specifies a recovery sequence number of a consistency group of the data to be recovered,
    creating a recovery copy relationship between the production volume and the recovery volume and an internal copy relationship between a backup volume and the recovery volume;
    creating a recovery copy data structure with indicators for storage locations of the recovery volume, wherein each of the indicators in the recovery copy data structure corresponds to each of the storage locations of the recovery volume and indicates whether data in that storage location of the recovery volume is valid;
    creating a recovery target data structure with indicators for the storage locations of the recovery volume, wherein each of the indicators in the recovery target data structure corresponds to each of the storage locations of the recovery volume and indicates whether data in that storage location of the recovery volume is valid;
  receiving a read operation for a storage location of a cache; and
  based on a value of an indicator in the recovery copy data structure for the storage location of the recovery volume and a value of an indicator in the recovery target data structure for the storage location of the recovery volume, staging the data from one of the production volume, the recovery volume, and the backup volume to the cache, wherein,
    in response to determining that the indicator in the recovery copy data structure for the storage location of the recovery volume is set to indicate that the data has been copied to the storage location of the recovery volume from the backup volume or was not found on the backup volume, and,
    in response to determining that the indicator in the recovery target data structure for the storage location of the recovery volume is set to indicate that the data has been copied to the storage location of the recovery volume from the production volume, staging the data from the recovery volume to the cache.

14. The computer-implemented method of claim 13, further comprising:
  in response to determining that the indicator in the recovery copy data structure for the storage location of the recovery volume is set to indicate that the data has been copied to the storage location of the recovery volume from the backup volume or was not found on the backup volume, and, in response to determining that the indicator in the recovery target data structure for the storage location of the recovery volume is set to indicate that the data has not been copied to the storage location of the recovery volume from the production volume,
    staging the data from the production volume to the cache;
    destaging the data from the cache to the recovery volume;
    resetting the indicator for the storage location in the recovery target data structure to indicate that the data is valid for that storage location; and
    resetting the indicator for the storage location in the recovery copy data structure to indicate that the data is valid for that storage location.

15. The computer-implemented method of claim 13, further comprising:
  in response to determining that the indicator in the recovery copy data structure for the storage location of the recovery volume is set to indicate that the data has not been copied to the storage location of the recovery volume from the backup volume and determining that the data is found on the backup volume,
    staging the data from the backup volume to the cache;
    destaging the data from the cache to the recovery volume;
    resetting the indicator for the storage location in the recovery target data structure to indicate that the data is valid for that storage location; and
    resetting the indicator for the storage location in the recovery copy data structure to indicate that the data is valid for that storage location.

16. The computer-implemented method of claim 13, further comprising:
   in response to determining that the indicator in the recovery copy data structure for the storage location of the recovery volume is set to indicate that the data has not been copied to the storage location of the recovery volume from the backup volume and determining that the data is not found on the backup volume,
      resetting the indicator for the storage location in the recovery copy data structure to indicate that the data was not found on the backup volume; and
   in response to determining that the indicator in the recovery target data structure for the storage location of the recovery volume is set to indicate that the data has been copied to the storage location of the recovery volume from the production volume, staging the data from the recovery volume to the cache.

17. The computer-implemented method of claim 13, wherein a storage controller, production storage containing the production volume, backup storage containing the backup volume, recovery storage containing the recovery volume, and the cache are in a cloud infrastructure.

18. The computer-implemented method of claim 13, further comprising:
   in response to determining that the indicator in the recovery copy data structure for the storage location of the recovery volume is set to indicate that the data has not been copied to the storage location of the recovery volume from the backup volume and determining that the data is not found on the backup volume,
      resetting the indicator for the storage location in the recovery copy data structure to indicate that the data was not found on the backup volume; and
   in response to determining that the indicator in the recovery target data structure for the storage location of the recovery volume is set to indicate that the data has not been copied to the storage location of the recovery volume from the production volume,
      staging the data from the production volume to the cache;
      destaging the data from the cache to the recovery volume;
      resetting the indicator for the storage location in the recovery target data structure to indicate that the data is valid for that storage location; and
      resetting the indicator for the storage location in the recovery copy data structure to indicate that the data is valid for that storage location.

\* \* \* \* \*